United States Patent
Atakan et al.

(10) Patent No.: US 10,695,949 B2
(45) Date of Patent: Jun. 30, 2020

(54) LIGHTWEIGHT COMPOSITE MATERIALS PRODUCED FROM CARBONATABLE CALCIUM SILICATE AND METHODS THEREOF

(71) Applicants: Solidia Technologies, Inc., Piscataway, NJ (US); Asahi Kasei Construction Materials Corporation, Tokyo (JP)

(72) Inventors: Vahit Atakan, West Windsor, NJ (US); Sadananda Sahu, Cleveland, OH (US); Hirotaka Takase, Tokyo (JP); Takayuki Kamata, Tokyo (JP); Katsuhiko Kanno, Tokyo (JP); Yoshihito Fukasawa, Tokyo (JP); Omkar Deo, Piscataway, NJ (US); David Vuong, Piscataway, NJ (US)

(73) Assignees: SOLIDIA TECHNOLOGIES, LTD., Piscataway, NJ (US); ASAHI KASEI CONSTRUCTION MATERIALS CORPORATION, Tokyo (JP)

(*) Notice: Subject to any disclaimer, the term of this patent is extended or adjusted under 35 U.S.C. 154(b) by 600 days.

(21) Appl. No.: 14/715,497

(22) Filed: May 18, 2015

(65) Prior Publication Data
US 2016/0340261 A1  Nov. 24, 2016

(51) Int. Cl.
*C04B 38/00* (2006.01)
*B28B 1/50* (2006.01)
*C04B 28/18* (2006.01)

(52) U.S. Cl.
CPC .............. *B28B 1/50* (2013.01); *C04B 28/188* (2013.01); *Y02P 40/18* (2015.11)

(58) Field of Classification Search
CPC .................................................. C04B 28/188
See application file for complete search history.

(56) References Cited

U.S. PATENT DOCUMENTS 4,436,498 A   3/1984  Murray
4,956,321 A   9/1990  Barrall
(Continued)

FOREIGN PATENT DOCUMENTS

WO   2009/103885 A2   8/2009
WO   2009/102360 A2   1/2010
(Continued)

OTHER PUBLICATIONS

Narayanan, N.; Ramamurthy, K.; "Structure and Properties of Aerated Concrete: a Review"; Cement & Concrete Composites. 2000, vol. 22, p. 321-329.*
(Continued)

*Primary Examiner* — Mark Ruthkosky
*Assistant Examiner* — Julia L Rummel
(74) *Attorney, Agent, or Firm* — Dentons US LLP

(57) ABSTRACT

An aerated composite material produced from carbonatable calcium silicate compositions (carbonation cured AAC) that has a compressive strength equivalent to autoclaved aerated concrete (ordinary AAC) at substantially the same density and a process of production of the same are provided. The composite material of the present invention comprises: a plurality of bonding elements, each including a core comprising calcium silicate, a first layer which partially or fully surrounds the core and is rich in $SiO_2$, and a second layer which partially or fully surrounds the first layer and is rich in $CaCO_3$; a plurality of filler particles having their particle sizes ranging from 0.1 μm to 1000 μm; and a plurality of voids; wherein the plurality of bonding elements and plurality of filler particles together form a bonding matrix and are substantially evenly dispersed in the matrix and bonded together, the plurality of voids are bubble-shaped and/or interconnected channels, a pore volume with a radius of 0.004 μm to 10.0 μm in the plurality of voids is 0.30
(Continued)

ml/composite material 1 g or less, and a estimated compressive strength expressed by the following formula (1): estimated compressive strength (absolute dry density=0.50) =compressive strength×(0.50+absolute dry density)$^2$ is 2.0 N/mm$^2$ or greater.

16 Claims, 12 Drawing Sheets

(56) References Cited

U.S. PATENT DOCUMENTS

| | | |
|---|---|---|
| 8,114,367 B2 | 2/2012 | Riman et al. |
| 2005/0284339 A1 | 12/2005 | Brunton et al. |
| 2007/0062416 A1 | 3/2007 | Brzuskiewicz et al. |
| 2009/0090276 A1* | 4/2009 | Feng ............... C04B 22/10 106/640 |
| 2009/0133361 A1 | 5/2009 | Vera |
| 2009/0142578 A1 | 6/2009 | Riman et al. |
| 2009/0143211 A1 | 6/2009 | Riman et al. |
| 2010/0077691 A1 | 4/2010 | Constantz et al. |
| 2010/0326328 A1 | 12/2010 | Constantz et al. |
| 2011/0067600 A1 | 3/2011 | Constantz et al. |
| 2011/0067605 A1 | 3/2011 | Constantz et al. |
| 2011/0104469 A1 | 5/2011 | Riman et al. |
| 2011/0129407 A1 | 6/2011 | Riman et al. |
| 2011/0182799 A1 | 7/2011 | Riman et al. |
| 2011/0203489 A1 | 8/2011 | Constantz et al. |
| 2011/0290156 A1 | 12/2011 | Constant et al. |
| 2012/0312194 A1 | 12/2012 | Riman et al. |
| 2013/0122267 A1 | 5/2013 | Riman et al. |
| 2014/0127450 A1 | 5/2014 | Riman et al. |
| 2014/0127458 A1 | 5/2014 | Riman et al. |
| 2014/0263683 A1 | 9/2014 | Krishnan et al. |
| 2014/0272216 A1 | 9/2014 | Deo et al. |
| 2014/0314990 A1 | 10/2014 | Henn et al. |
| 2014/0322083 A1 | 10/2014 | Kuppler et al. |
| 2014/0342124 A1 | 11/2014 | Zambrzycki et al. |
| 2014/0361471 A1 | 12/2014 | Hu et al. |
| 2014/0363665 A1 | 12/2014 | Kuppler et al. |
| 2015/0056437 A1 | 2/2015 | Deo et al. |
| 2015/0225295 A1 | 8/2015 | McCandlish et al. |
| 2015/0266778 A1 | 9/2015 | Riman et al. |
| 2015/0336852 A1 | 11/2015 | Patten et al. |
| 2016/0031757 A1 | 2/2016 | Atakan et al. |
| 2016/0096773 A1 | 4/2016 | Quinn et al. |
| 2016/0168720 A1 | 6/2016 | Jain et al. |

FOREIGN PATENT DOCUMENTS

| | | |
|---|---|---|
| WO | 2011/053598 A2 | 5/2011 |
| WO | 2011/090967 A2 | 7/2011 |
| WO | 2012/122031 A2 | 9/2012 |
| WO | 2014/159832 A2 | 10/2014 |
| WO | 2014/160168 A2 | 10/2014 |
| WO | 2014/165252 A2 | 10/2014 |
| WO | 2014/165257 A2 | 10/2014 |
| WO | 2014/197532 A2 | 12/2014 |
| WO | 2014/197545 A2 | 12/2014 |
| WO | 2015/026900 A2 | 2/2015 |
| WO | 2015/051243 A2 | 4/2015 |
| WO | 2015/103107 A2 | 7/2015 |
| WO | 2015/112655 A2 | 7/2015 |
| WO | 2016/022485 A2 | 2/2016 |
| WO | 2016/022522 A2 | 2/2016 |
| WO | 2016/054602 A2 | 4/2016 |

OTHER PUBLICATIONS

PCT/US2014/024987, Int'l Search Report of ISA, dated Aug. 14, 2014.
PCT/US2014/025278, Int'l Search Report of ISA, dated Aug. 14, 2014.
PCT/US2014/024996, Int'l Search Report of ISA, dated Aug. 21, 2014.
PCT/US2014/025958, Int'l Search Report of ISA, dated Sep. 4, 2014.
PCT/US2014/040816, Int'l Search Report of ISA, dated Oct. 30, 2014.
PCT/US2014/040789, Int'l Search Report of ISA, dated Sep. 30, 2014.
PCT/US2014/059024, Int'l Search Report of ISA, dated Apr. 2, 2015.
PCT/US2014/072494, Int' Search Report and Written Opinion of ISA, dated Jun. 4, 2015.
PCT/US2015/043452, Int' Search Report and Written Opinion of ISA, dated Dec. 17, 2015.
PCT/US2015/043540, Int' Search Report and Written Opinion of ISA, dated Jan. 27, 2016.
PCT/US2016/023181, Int' Search Report and Written Opinion of ISA, dated Jun. 13, 2016.
PCT/US2015/053879, Int' Search Report and Written Opinion of ISA, dated Jan. 28, 2016.
PCT/US2016/023193, Int' Search Report and Written Opinion of ISA, dated Jun. 13, 2016.

* cited by examiner

LIGHTWEIGHT COMPOSITE MATERIALS PRODUCED FROM CARBONATABLE CALCIUM SILICATE AND METHODS THEREOF

TECHNICAL FIELD OF THE INVENTION

The invention generally relates to a composite material and a process of production of the same. More particularly, the present invention relates to a novel lightweight aerated composite material made from a carbonatable calcium silicate composition, and formulations and methods of manufacture and use thereof. The lightweight aerated composite material is comprised of calcium carbonate ($CaCO_3$) and Silica ($SiO_2$), as cured products of carbonatable calcium silicate compositions.

BACKGROUND OF THE INVENTION

In general, autoclaved aerated concrete ("ordinary AAC") is one example of lightweight precast concrete which is formed under a high temperature and high pressure (for example, 190° C., 12 atm) cured for 6 to 8 hours using raw materials such as calcareous materials of cement and lime (CaO), siliceous materials such as silica ($SiO_2$), silica sand ($SiO_2$), and other materials such as gypsum ($CaSO_4$), recycled materials produced in manufacturing such as fly ash, metal aluminum and other aerating agents, surfactants for stabilizing the bubbles, and other fillers. The aerating agent causes air voids to form in the matrix and increases the porosity of the material. This causes an increase in the volume and thereby reduces the density of the material.

Ordinary AAC products offer a number of advantages over conventional concretes such as good strength-to-weight ratio, resistance to fire, corrosion, termites and molds, as well as good thermal insulation and sound deadening properties. Due to their lightweight and dimensional accuracy, ordinary AAC products can be assembled with minimal waste thereby reducing the need for additional equipment in construction and assembling. They offer high durability and require minimum maintenance. The lightweight of an ordinary AAC also helps with lowering shipping costs. Although the compressive strength of an ordinary AAC depends on its total void volume, commercially available ordinary AAC achieve about 5 $N/mm^2$ at an absolute dry density of 0.50 $g/cm^3$. These properties sufficiently meet the strength requirements for building materials.

Despite their overarching benefits, ordinary AAC are prepared by processes that commonly suffer from a number of deficiencies. The manufacturing process of ordinary AAC involves special equipment, large energy consumption, and excessive carbon dioxide emission, leaving unfavorable carbon footprint. Ordinary AAC are typically cured in autoclaves at temperatures ranging from 150° C. to 190° C. and at pressures ranging from 0.8 MPa to 1.2 MPa. These conditions lead to the creation of a stable form of tobermorite, which is the primary bonding element in ordinary AAC. In addition, they are relatively expensive due to high finishing costs and are also difficult to recycle.

As building materials for making walls, room partitions, and floors, ordinary AAC panels use either reinforcing structures (for example, iron rods) embedded inside them or non-reinforcing structures. Such ordinary AAC also consist of large number of pores and bubbles that can simultaneously hold some amount of water. This water is found to be present even when the ordinary AAC is in a usual usage environment. Since ordinary AAC have a large number of air bubbles inside them, carbon dioxide from the air can infiltrate inside the ordinary AAC over time. The infiltrated carbon dioxide can also dissolve into such water, where calcium derived from various components is also present.

Further, the water present in the ordinary AAC also helps in the reaction between calcium and carbon dioxide to form calcium carbonate as a precipitate. This is generally referred to as "carbonation". This carbonation phenomenon usually occurs in conventional concrete materials. As a result of carbonation, the concrete structure becomes dense and its strength increases, while its water adsorption falls. Other phenomena simultaneously occur, for example, shrinkage of the structure (matrix), formation of micro-cracks, and drop in strength due to rusting of the iron reinforcement accompanying neutralization. Similar phenomena can arise with ordinary AAC. In ordinary AAC, when such carbonation proceeds excessively over a long period of time, the above-mentioned shrinkage of the matrix can cause problems accompanying carbonation in the same way as in the case in conventional concrete materials.

To suppress carbonation, a hydrothermal reaction is employed in the production of ordinary AAC by steam curing under a high temperature and high pressure ("autoclaving") to cause formation of a sufficient amount of the mineral crystal, tobermorite and thereby decreasing the speed of carbonation and suppressing the issues caused by carbonation, which occurs over a long period of time in an ordinary usage environment.

For example, Japanese Patent Publ. No. 5-310480A describes ordinary AAC as a structure where air bubbles are connected to form innumerable pores that extend from the surface to the inside, allowing water to be easily absorbed from the surface. Since the absorbed water contains dissolved carbon dioxide gas, it reacts with the tobermorite crystals and CSH gel in the ordinary AAC to form calcium carbonate and cause the so-called carbonation phenomenon. Japanese Patent Publ. No. 5-310480A also describes the general practice of making ordinary AAC panels that include cage-like iron reinforcement or steel netting or other reinforcement material. When iron reinforcement or other reinforcement is used in case of ordinary AAC it has a tendency to absorb water right to its center, necessitating rust-prevention.

While the above method may be applied to decrease the rate of carbonation when using ordinary AAC in an ordinary usage environment, there are situations where the amount of formation of tobermorite at the time of production of ordinary AAC is small or when ordinary AAC is used in an environment, different from an ordinary usage environment, where the concentration of carbon dioxide in the air is high. In such circumstances even if these methods are used, excessive carbonation can still become a serious problem. Therefore, there is a need to mitigate the problems that may occur due to the excessive rate of carbonation in case of ordinary AAC.

Recently, to avoid in principle the problems such as carbonation in concretes and ordinary AAC, WO2012/122031A discloses an improved bonding matrix in place of conventional cement, concrete, or other ceramic material such as $CaO.2SiO_2.4H_2O$ and $CaO.H_2O$ or other weak hydrated Portland cement. The bonding element of such a bonding matrix is, for example, comprised of a precursor particle comprised of calcium silicate ($CaSiO_3$). This precursor particle can react with the carbon dioxide dissolved in water. Calcium cations are leached from calcium silicate particles and transform the peripheral portion of the calcium silicate particle core into calcium-deficient. As the calcium cations continue to be leached from the peripheral portion of the core, the structure of the peripheral portion eventually become unstable and breaks down, thereby transforming the calcium-deficient peripheral portion of the core into a predominantly silica-rich first layer. Meanwhile, a predominantly calcium carbonate second layer precipitates from the water. The formation of these layers is not uniform in the case of composite particle.

Specifically, the first layer and the second layer are formed from the precursor particle by a reaction of $H_2O+CaSiO_3+CO_2 = CaCO_3+SiO_2+H_2O$. That is, carbon dioxide selectively reacts with the Ca cations of the silica precursor core whereby the peripheral portion of the precursor core is transformed to a silica-rich first layer and calcium carbonate-rich second layer. The presence of the first layer and the second layer on the core acts as a barrier to further reaction of the calcium silicate particles and carbon dioxide. As a result, a bonding element comprising a core, first layer, and second layer is formed.

More particularly, the bonding element described in WO2012/122031A is already sufficiently carbonated at the time of production, so at least the problems of carbonation that occur along with the elapse of time in the concretes and ordinary AAC of the prior art, are avoided. This bonding element can be formed by the method of gas-assisted hydrothermal liquid phase sintering. In such a method, a porous solid body including a plurality of precursor particles is exposed to a solvent, which partially saturates the pores of the porous solid body, i.e., that the volume of the pores are partially filled with water. A gas comprising a reactant of carbon dioxide is introduced into the partially saturated pores of the porous solid body where the solvent dissolves the reactant. The dissolved reactant is depleted from the solvent due to the reaction, but the gas comprising the reactant continues to be introduced into the partially saturated pores to supply additional reactant to the solvent.

As the reaction between the reactant and the at least first chemical element of the precursor particles progresses, the peripheral portion of the precursor particle is transformed into the first layer and the second layer. The presence of the first layer at the periphery of the core eventually hinders further reaction by separating the reactant and the at least first chemical element of the precursor particle, thereby causing the reaction to effectively stop, leaving a bonding element having the core as the unreacted center of the precursor particle, the first layer at a periphery of the core, and a second layer on the first layer. As a result of the transformation, the core has a shape similar to the precursor particle, but has a smaller size. The first layer and the second layer partially or completely cover the core and have uniform or non-uniform thicknesses which enable formation of porous structures depending on the size and shape of the pores which surrounded the precursor particle during the transformation process. The resulting bonding element includes the core, the first layer and the second layer, and is generally larger in size than the precursor particle, filling in the surrounding porous regions of the porous solid body and possibly bonding with adjacent materials in the porous solid body. As a result, the net-shape of the products that may be formed have more or less the same size and shape as their original forms but a higher density than the porous solid body.

Furthermore, WO2014/165252A discloses a carbonation-cured material constituted by an aerated composite material using a carbonatable calcium silicate composition and a process of production of the same. As explained above, ordinary AAC utilizes the hydrothermal reaction due to autoclaving at the time of production so as to form tobermorite crystals and cure the material, followed by a reduction in temperature and pressure to respectively ordinary temperature and ordinary pressure. The material is then taken out from the autoclave for processing its surfaces and end-parts as per the product specifications before supplying it for practical use.

In the process of producing aerated composite material using a carbonatable calcium silicate composition ("carbonation cured ACC"), the carbonation occurs when the calcium and carbon dioxide are reacted. This novel method of replacing conventional Portland cement for producing AAC can significantly reduce energy requirement and $CO_2$ emissions. The disclosed carbonatable calcium silicate compositions are made from widely available, low-cost raw materials by a process suitable for large-scale production with flexible equipment and production requirements. This unique approach is also accompanied by a remarkable proficiency for permanently and safely sequestrating $CO_2$. A wide variety of applications can benefit from the invention, from construction, pavements and landscaping, to infrastructure and transportation through improved energy consumption and more desirable carbon footprint.

Thus, in an aerated composite material made from a carbonatable calcium silicate composition, the high temperature, high-pressure atmosphere in ordinary AAC is not required and autoclaving becomes unnecessary. It becomes possible to significantly lower the temperature at the time of curing. That is, in an aerated composite material using a carbonatable calcium silicate composition, carbonation is utilized for the curing itself, so the carbonation after production can be greatly reduced and the occurrence of problems in case of ordinary AAC associated with excessive carbonation can be fundamentally eliminated.

WO2014/165252A describes an aerated composite material made from calcium silicate compositions where a plurality of voids comprise bubble-shaped and/or interconnected channels account for 50 vol % to 80 vol % of the composite material and where the composite material exhibits a density of approximately 300 kg/m³ to 1500 kg/m³, exhibits a compressive strength of approximately 2.0 MPa to approximately 8.5 MPa (N/mm²), and exhibits a flexural strength of approximately 0.4 MPa to approximately 1.7 MPa.

However, the compressive strength of an aerated composite material depends on the density and further the density depends on the void volume. The void volume can more particularly be divided into the bubble volume and the pore volume. The bubble volume depends on the amount of addition of the foaming agent (aerating agent) such as metal aluminum (aluminum powder). Changing the amount of addition of this foaming agent can easily control the bubble volume. On the other hand, the pore volume can be controlled by the water content present at the time of mixing of the raw materials (water/solids (W/S) ratio) and the degree of advance of carbonation at the time of curing. That is, in principle, these factors can be changed to control the density-strength property. The literature, however, does not specifically disclose or teach at all what kind of compressive strength can be achieved at a specific void volume and a specific density much less specifically disclose, teach, or suggest the void volume and more particularly the bubble volume and pore volume.

SUMMARY OF INVENTION

An aerated composite material prepared from calcium silicate compositions has several advantages compared to ordinary AAC. However, while a commercially available ordinary AAC realizes a higher compressive strength of approximately 5 N/mm² at an absolute dry density of 0.50 g/cm³ and adequately satisfies the strength requirements as a building material, it remains a challenge to produce an aerated composite material from calcium silicate compositions that achieves a compressive strength similar to ordinary AAC at the same amount of bubbles when compared with the latter at the current state of the art. Under the circumstances, the technical problem of the present invention is to provide an aerated composite material that is prepared from calcium silicate compositions, which has a compressive strength equivalent to ordinary AAC at substantially the same density.

The inventors engaged in intensive studies and repeated experiments to solve this problem and as a result discovered that of the pores having radius from 0.004 μm to 10.0 μm are mostly saturated by water before carbonation. As the carbonatable calcium silicate composition undergoes carbonation, these pores are effectively filled by precipitation of calcium carbonate. The pores in the bubble volume having radius 10.0 μm or more are not saturated by water before carbonation, so at these bubbles the calcium carbonate precipitates only inside the adsorbed water layer. The bubble volume can also be easily controlled by the dosage of the foaming agent (aerating agent), e.g., metal aluminum. In addition to the control of volume of air bubbles, it is very important to control the densification of the solid part supporting the air bubbles (below, also called the "bonding matrix" or simply the "matrix"). Effective control of the pore volume greatly affects the compressive strength. Therefore, in carbonation-cured AAC, to achieve the same compressive strength as that of an ordinary AAC at the same absolute dry density, the challenge lies in increasing the bubble volume while preventing a drop in compressive strength and a reduction in pore volume (in other words, increasing the carbonation so as to densify the solid parts that support the air bubbles). The inventors completed the present invention based on this discovery. That is, the present invention is as outlined below:

In one aspect, the invention generally relates to a composite material, which includes: a plurality of bonding elements, each including a core comprising calcium silicate, a first layer which partially or fully surrounds the core and is rich in $SiO_2$, and a second layer which partially or fully surrounds the first layer and is rich in $CaCO_3$; a plurality of filler particles having sizes of particle sizes of 0.1 μm to 1000 μm; and a plurality of voids. In the composite material, the plurality of bonding elements and plurality of filler particles together form a bonding matrix and are substantially evenly dispersed in the matrix and are bonded together. The plurality of voids are bubble-shaped and/or interconnected channels; a pore volume with a radius of 0.004 μm to 10.0 μm in the plurality of voids is 0.30 ml/composite material 1 g or less; and an estimated compressive strength expressed by the following formula (1):

Estimated compressive strength (absolute dry density=0.50)=compressive strength×(0.50÷absolute dry density)² is 2.0 N/mm² or more.

In certain embodiments, the pore volume with a radius of 0.004 μm to 10.0 μm in the composite material is 0.24 ml/composite material 1 g or less and the estimated compressive strength is 2.5 N/mm² or more.

In certain embodiments, the pore volume with a radius of 0.004 μm to 10.0 μm in the composite material is 0.19 ml/composite material 1 g or less and the estimated compressive strength is 3.7 N/mm² or more.

In certain embodiments, the pore volume with a radius of 0.004 μm to 10.0 μm in the composite material is 0.17 ml/composite material 1 g or less and the estimated compressive strength is 4.5 N/mm² or more.

In certain embodiments, the pore volume with a radius of 0.004 μm to 10.0 μm in the composite material is 0.15 ml/composite material 1 g or less and the estimated compressive strength is 5.0 N/mm² or more.

In certain embodiments, the plurality of bonding elements is chemically transformed from ground calcium silicate. In certain embodiments, the ground calcium silicate comprises one or more of a group of calcium silicate phases selected from CS (wollastonite or pseudowollastonite), C3S2 (rankinite), C2S (belite, larnite, bredigite), an amorphous calcium silicatephase, each of which material optionally comprises one or more metal ions or oxides, or blends thereof.

In certain embodiments, the plurality of bonding elements is chemically transformed from ground wollastonite or composite cement particles comprising calcium silicates by reacting the ground wollastonite, or composite cement particles comprising calcium silicates, with $CO_2$ via a controlled hydrothermal liquid phase sintering (HLPS) process.

In certain embodiments, the filler particles are a CaO-rich material. In certain embodiments, the filler particles are selected from the group consisting of lime and quartz. In certain embodiments, the filler particles are selected from the group consisting of industrial waste, lime, different types of fly ash, slag, and silica fume.

In certain embodiments, the plurality of voids is formed by hydrogen gas, which is generated by reacting an aerating agent in an alkali atmosphere.

In certain embodiments, the aerating agent is a powder, which includes at least one of aluminum, iron, calcium carbonate, and blends of the same.

In another aspect, the invention generally relates to a process of production of a composite material. The process includes: forming a wet mixture, wherein the wet mixture comprises water, filler particles comprising CaO or Si having a particle size of 0.1 μm to 1000 μm, ground calcium silicate particles, and an aerating agent, has a water/solid ratio (W/S) of 0.45 or less; casting the wet mixture in a mold; allowing the aerating agent to generate hydrogen gas thereby causing volume expansion of the wet mixture; pre-curing the obtained expanded mixture to a hardness enabling it to be taken out from the mold and moved; cutting the obtained pre-cured expanded mixture into a desired product shape; and causing the cut expanded mixture to cure at ordinary pressure, 60° C. or more of temperature, a relative humidity of 65% or more, and an atmosphere of a $CO_2$ gas concentration of 95% for 6 hours to 60 hours.

In certain embodiments of the process, the ground calcium silicate particles comprise one or more of a group of calcium silicate phases selected from CS (wollastonite or pseudowollastonite), C3S2 (rankinite), C2S (belite, larnite, bredigite), an amorphous calcium silicate phase, each of which material optionally comprises one or more metal ions or oxides, or blends thereof. In certain embodiments, the temperature at the carbonation step is 80° C. or more. In certain embodiments, the relative humidity at the carbonation step is 95% or more.

In certain embodiments, the time at the carbonation step is 40 hours or more.

The composite material according to the present invention is carbonation cured AAC, which has a compressive strength that is substantially equal to that of ordinary AAC and avoids the problems related to carbonation in ordinary AAC while realizing the strength that is substantially equal to the strength of ordinary AAC. The carbonation cured AAC, therefore, can be suitably used as a building material. Furthermore, in the process of production of the composite material according to the present invention, massive energy consumption, excessive emission of carbon diode, and undesired carbon footprint can be suppressed.

BRIEF DESCRIPTION OF THE DRAWINGS

FIG. 1(a) fibrous, FIG. 1(b) elliptical, and FIG. 1(c) equiaxed.

FIG. 2(a) shows 1D oriented fiber-shaped bonding elements in a dilute bonding matrix (bonding elements are not touching), FIG. 2(b) shows 2D oriented platelet shaped bonding elements in a dilute bonding matrix (bonding elements are not touching), FIG. 2(c) shows 3D oriented platelet shaped bonding elements in a dilute bonding matrix (bonding elements are not touching), and FIG. 2(d) shows randomly oriented platelet shaped bonding elements in a dilute bonding matrix (bonding elements are not touching).

FIG. 2(e) shows a concentrated bonding matrix (with a volume fraction sufficient to establish a percolation network) of bonding elements where the matrix is 3D oriented and FIG. 2(f) shows a concentrated bonding matrix (with a volume fraction sufficient to establish a percolation network) of randomly oriented bonding elements, wherein filler components such as polymers, metals, inorganic particles, aggregates, etc., may be included.

DETAILED DESCRIPTION OF THE INVENTION

Figure 1A:
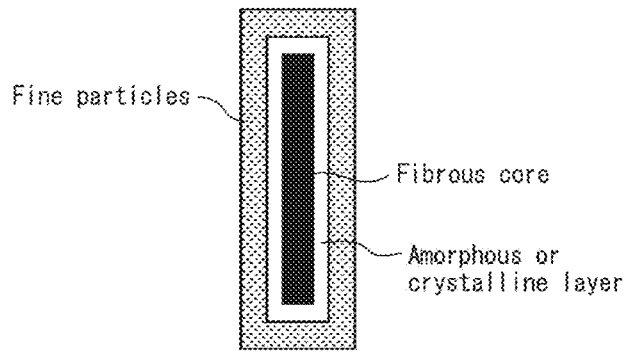
FIGS. 1(a)-1(c) are schematic illustrations of cross-sections of bonding elements according to exemplary embodiments, including three exemplary core morphologies.

This invention provides an aerated composite material produced from a carbonatable calcium silicate composition that has a compressive strength equivalent to ordinary AAC at substantially the same density.

Herein, exemplary embodiments of the present invention are explained in detail.

In one aspect, the composite material of the present invention is a composite material comprising:
a plurality of bonding elements, each including a core comprising calcium silicate, a first layer which partially or fully surrounds the core and is rich in $SiO_2$, and a second layer which partially or fully surrounds the first layer and is rich in $CaCO_3$, in certain instances the layers are not distinct;
a plurality of filler particles having sizes of particle sizes of 0.1 μm to 1000 μm; and
a plurality of voids;
wherein
the plurality of bonding elements and plurality of filler particles together form a bonding matrix and are substantially evenly dispersed in the matrix and bonded together,
the plurality of voids are bubble-shaped and/or interconnected channels, a pore volume with a radius of 0.004 μm to 10.0 μm (e.g., from 0.004 μm to 5.0 μm, from 0.004 μm to 1.0 μm, from 0.004 μm to 0.5 μm, from 0.004 μm to 0.1 μm, from 0.004 μm to 0.05 μm, from 0.004 μm to 0.01 m, from 0.01 μm to 10.0 μm, from 0.05 μm to 10.0 μm, from 0.1 μm to 10.0 μm, from 0.5 μm to 10.0 μm, from 1.0 μm to 10.0 μm) in the plurality of voids is 0.30 ml/composite material 1 g or less (e.g., 0.24 ml/composite material 1 g or less, 0.19 ml/composite material 1 g or less, 0.17 ml/composite material 1 g or less, 0.15 ml/composite material 1 g or less), and an estimated compressive strength expressed by the following formula (1):

$$\text{Estimated compressive strength (absolute dry density=0.50)} = \text{compressive strength} \times (0.50 \div \text{absolute dry density})^2$$

is 2.0 N/mm² or more (e.g., 2.5 N/mm² or more, 3.7 N/mm² or more, 4.5 N/mm² or more, 5.0 N/mm² or more).

In another aspect, the invention provides a process of production of a composite material. The process includes: forming a wet mixture, wherein the wet mixture comprises water, filler particles comprising CaO or Si having a size of a particle size of 0.1 μm to 1000 m (e.g., from 0.1 μm to 500 μm, from 0.1 μm to 100 μm, from 0.1 μm to 50 μm, from 0.1 μm to 10 μm, from 0.1 μm to m, from 0.1 μm to 1 μm, from 0.5 μm to 1000 μm, from 1 m to 1000 μm, from 5 μm to 1000 μm, from 10 μm to 1000 m, from 50 μm to 1000 μm, from 100 μm to 1000 μm), ground calcium silicate particles, and an aerating agent, has a water/solid ratio (W/S) of 0.45 or less (e.g., 0.4, 0.35, 0.3, 0.25); casting the wet mixture in a mold; allowing the aerating agent to generate hydrogen gas thereby causing volume expansion of the wet mixture; pre-curing the obtained expanded mixture to a hardness enabling it to be taken out from the mold and moved; cutting the obtained pre-cured expanded mixture into a desired product shape; and causing the cut expanded mixture to cure at ordinary pressure, 60° C. or more of temperature, a relative humidity of 65% or more (e.g., 70% or more, 75% or more, 80% or more, 85% or more, 90% or more, 95% or more), and an atmosphere of a $CO_2$ gas concentration of 95% for 6 hours to 60 hours (e.g., 10 hours, 15 hours, 20 hours, 30 hours, 40 hours, 50 hours).

Any suitable calcium silicate can be used as a precursor of the bonding elements. The calcium silicate composition may include various calcium silicates. The molar ratio of elemental Ca to elemental Si in the composition is from about 0.8 to about 1.2. The composition is comprised of a blend of discrete, crystalline calcium silicate phases, selected from one or more of CS (wollastonite or pseudowollastonite), C3S2 (rankinite) and C2S (belite or larnite or bredigite), at about 30% or more by mass of the total phases. The calcium silicate compositions are characterized by having about 30% or less of metal oxides of Al, Fe and Mg by total oxide mass, and being suitable for carbonation with $CO_2$ at a temperature of about 30° C. to about 90° C. to form $CaCO_3$ with mass gain of about 10% or more.

Calcium silicate compositions may include amorphous (non-crystalline) calcium silicate phases in addition to the crystalline phases described above. The amorphous phase may additionally incorporate Al, Fe and Mg ions and other impurity ions present in the raw materials. Each of these crystalline and amorphous calcium silicate phases is suitable for carbonation with $CO_2$.

The calcium silicate compositions may also include small quantities of residual CaO (lime) and $SiO_2$ (silica). The calcium silicate composition may also include small quantities of C3S (alite, $Ca_3SiO_5$). The C2S phase present within the calcium silicate composition may exist in any $\alpha$-$Ca_2SiO_4$, $\beta$-$Ca_2SiO_4$ or $\gamma$-$Ca_2SiO_4$ polymorph or combination thereof.

The calcium silicate compositions may also include quantities of inert phases such as melilite type minerals (melilite or gehlenite or akermanite) with the general formula (Ca,Na, K)$_2$[(Mg, Fe$^{2+}$, Fe$^{3+}$, Al, Si)$_3O_7$] and ferrite type minerals (ferrite or brownmillerite or $C_4AF$) with the general formula $Ca_2(Al,Fe^{3+})_2O_5$. In certain embodiments, the calcium silicate composition is comprised only of amorphous phases. In certain embodiments, the calcium silicate comprises only of crystalline phases. In certain embodiments, some of the calcium silicate composition exists in an amorphous phase and some exists in a crystalline phase.

As used herein, the term "calcium silicate composition" generally refers to naturally-occurring minerals or synthetic materials that are comprised of one or more of a group of calcium silicate phases including CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta$-$Ca_2SiO_4$ or larnite, $\beta$-$Ca_2SiO_4$ or bredigite, $\alpha$-$Ca_2SiO_4$ or $\gamma$-$Ca_2SiO_4$, and sometimes formulated as $Ca_2SiO_4$ or $2CaO.SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It is noted that preferably the carbonatable calcium silicate composition does not hydrate. However, minor amounts of hydratable calcium silicate phases (e.g., C2S, C3S and CaO) may be present. C2S exhibits slow kinetics of hydration when exposed to water and is quickly converted to $CaCO_3$ during $CO_2$ curing processes. C3S and CaO hydrate quickly upon exposure to water and thus should be limited to <5% by mass.

The calcium silicate phases included in the calcium silicate composition do not hydrate when exposed to water. Due to the composites produced using a calcium silicate composition as the binding agent do not generate significant strength when combined with water. The strength generation is controlled by exposure of calcium silicate composition containing composites to specific curing regimes in the presence of $CO_2$.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In the present embodiment, the plurality of bonding elements can preferably be chemically transformed from ground synthetic or naturally occurring calcium silicate composition, more preferably can be chemically transformed from ground calcium silicate composition by reacting the ground synthetic or natural occurring carbonatable calcium silicate composition with $CO_2$ by controlled hydrothermal liquid phase sintering (HLPS). Further, various HLPS apparatuses are disclosed and various features of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. patent application Ser. Nos. 14/045,758, 14/045,519, 14/045,766, 14/045,540, all filed Oct. 3, 2013, U.S. patent application Ser. Nos. 14/207,413, 14/207,421, filed Mar. 12, 2014, U.S. patent application Ser. Nos. 14/207,920, 14/209,238, filed Mar. 13, 2014, U.S. patent application Ser. Nos. 14/295,601, 14/295,402, filed Jun. 4, 2014, each of which is expressly incorporated herein by reference in its entirety for all purposes.

Figure 1B:
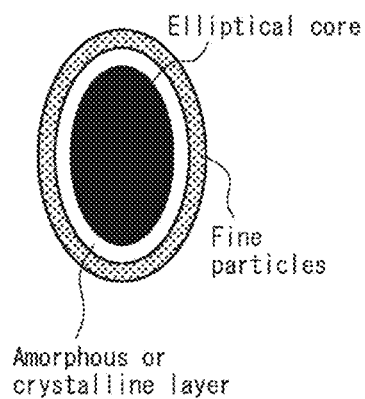
Figure 1C:
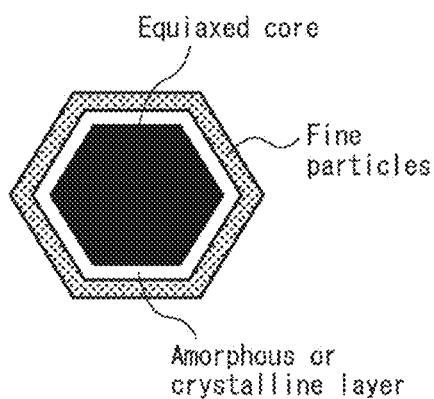

FIGS. 1(a) to 1(c) show exemplary embodiments of three types of bonding elements. The shapes and morphologies of the cores and/or bonding elements can be the same as or similar to the shapes of the precursor particles. Therefore, the precursor particles and, according to the same, the corresponding bonding elements and/or cores can include ones of spherical, elliptical, hexagonal or other polygonal shapes or numerous other shapes, but can be any of numerous morphologies not limited to these. Furthermore, the morphologies of the precursor particles and, according to the same, the corresponding bonding elements and/or cores may include equiaxed states or states where one axis is longer than the others such as with a wire or rod shape. Furthermore, the precursor particles can include single crystals (that is, be "monocrystalline") or a plurality of crystals (that is, be "polycrystalline"). The precursor particles can actually include a plurality of particles or include amorphous phases. As explained above, in the present embodiment, both the anions and cations differ in the different layers. The core has $Ca^{+2}$, $Si^{+4}$, and $O^{-2}$ ions, the second layer mainly has $Si^{+4}$ and $O^{-2}$ and a small amount of $Ca^{+2}$ ions, but the second layer has $Ca^{+2}$ and $CO_3^{-2}$ ions.

The bonding matrix of the present embodiment includes the above plurality of bonding elements. The bonding matrix can be porous. As explained later, the void volume depends on many variables, which can be used for controlling the porosity, such as: temperature, reactor design, precursor material, and amount of liquid that is introduced into the carbonation (transformation) step.

The bonding matrix may incorporate filler particles, which are mixed with the precursor materials during the later explained transformation process to create the composite material.

In general, the filler particles may include any one of a number of types of materials that can be incorporated into the bonding matrix such as inert materials and active materials. An inert material does not go through any chemical reaction during the transformation and does not act as a nucleation site. An active material can be comprised of a first type, which does not go through any chemical reaction during the transformation, but acts as a nucleation site and/or a second type, which chemically reacts with the bonding matrix during the transformation. The inert material may physically or mechanically interact with the bonding matrix, but does not go through any chemical reaction during the transformation and does not act as a nucleation site. The inert material may include polymers, metals, inorganic particles, aggregates, and the like. The first type of active material does not go through any chemical reaction during the transformation, but acts as a nucleation site. Further, it may physically or mechanically interact with the bonding matrix. When using bonding elements that have a carbonate phase as the second layer, this type of active material may, for example, include limestone, marble powder, and other calcium carbonate-containing materials. The second type of active material chemically reacts with the bonding matrix during the transformation. For example, lime makes the pH alkaline in the wet mixing step and causes the generation of hydrogen gas by the addition of aluminum powder (metal aluminum) to contribute the formation of bubbles, then acts as a calcium source during the transformation. Further, magnesium hydroxide can be used as a filler. It may chemically react with a dissolving calcium component phase from the bonding matrix to form magnesium calcium carbonate. Further, gypsum chemically reacts with the bonding matrix during the transformation and is sometimes added for the purpose of increasing the hardness at the time of pre-curing.

Figure 10:
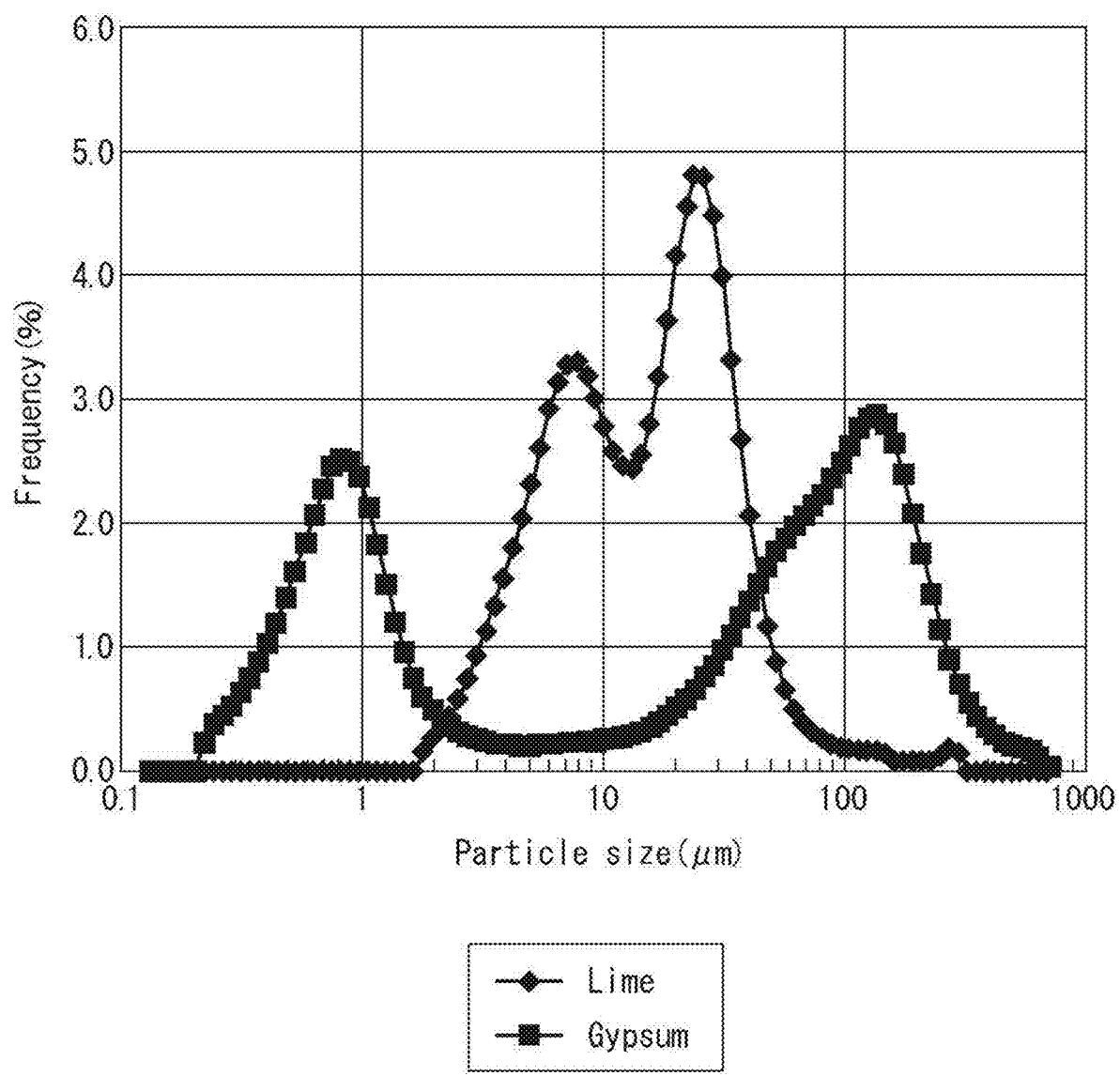
FIG. 10 is a graph that shows one example of particle size distributions of lime and gypsum.
Figure 11:
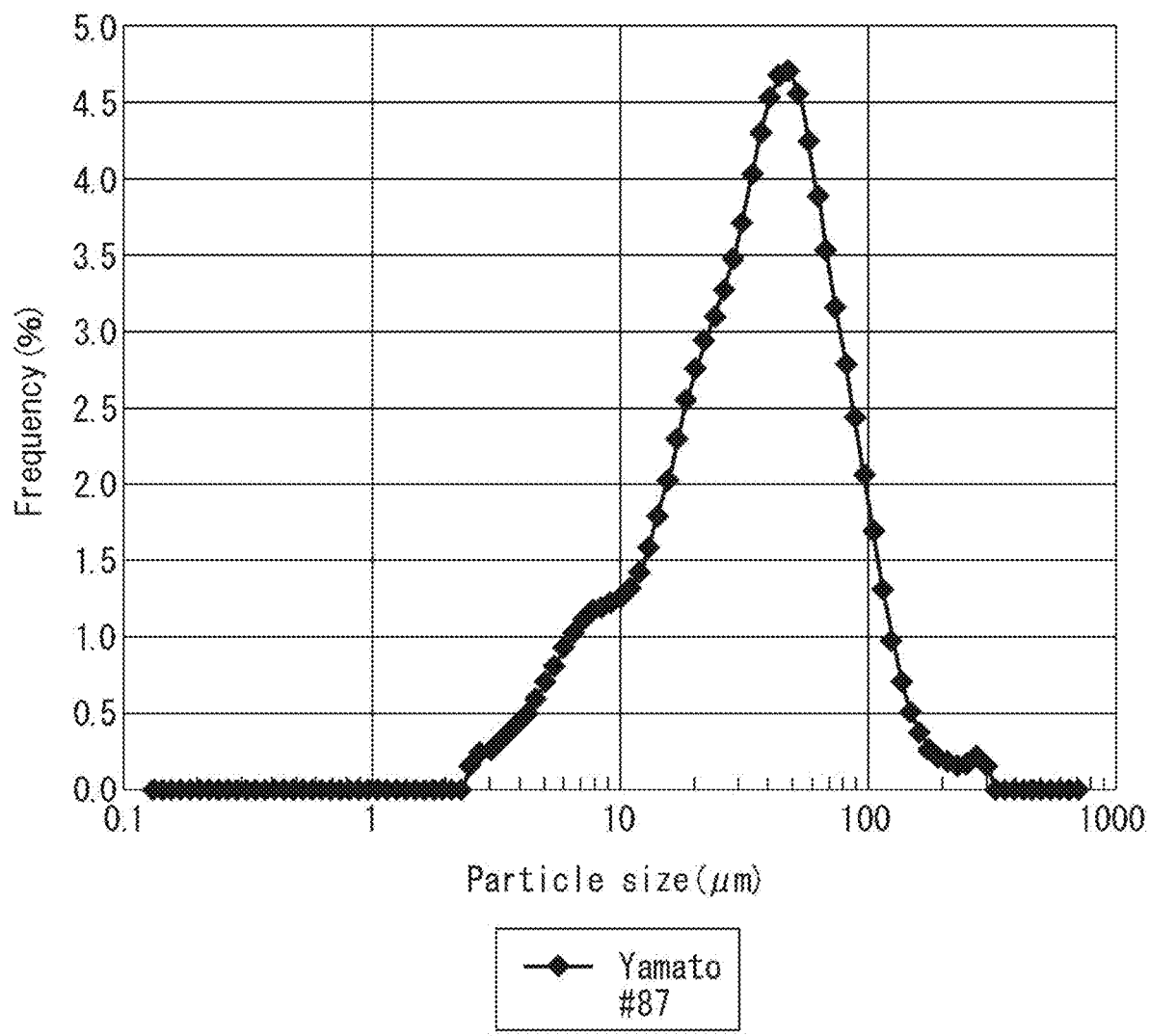
FIG. 11 is a graph that shows one example of a particle size distribution of metal aluminum (Yamato #87).

In the present embodiment, the filler particles may, for example, be CaO-containing or silicon-containing materials. The filler particles may be, for example, lime, quartz (including sand), wollastonite, xonotlite, burned oil shale, fly or volcanic ash, stack dust from kilns, ground clay, pumice dust. Materials such as industrial waste materials, lime, slag, and silica fume may also be used. In certain preferred embodiments, the filler particles may be light-weight aggregates such as pearlite or vermiculite, for example, may also be a CaO-rich material such as ground lime. In this Description, the term "lime" means a naturally-occurring or synthetic inorganic material mainly comprised of CaO or $Ca(OH)_2$. The plurality of filler particles may have any suitable median particle size and size distribution dependent on the desired composite material. However, in the present embodiment, the plurality of filler particles may have a particle size 0.1 μm to 1000 μm of size. The composite material of the present embodiment may further contain one or more additives for correcting the appearance and physical or mechanical properties. FIG. 10 shows one example of the particle size distribution of lime and gypsum. Further, FIG. 11 shows one example of the particle size distribution of metal aluminum (Yamato #87).

Within the bonding matrix, the bonding elements may be positioned, relative to each other in any one of a number of orientations. As such, the bonding matrix can exhibit any of numerous different patterns. For example, the bonding elements can be aligned in one direction (that is, "1-D" orientation), two directions (that is, "2-D" orientation), or three directions (that is, "3-D" orientation). Alternatively, the bonding elements can be aligned in a random pattern (that is, "random" orientation). Furthermore, the concentration of bonding elements in the bonding matrix may vary. For example, the concentration of bonding elements on a volume basis may be relatively high, wherein at least some of the bonding elements are in contact with one another. This situation may arise if filler material is incorporated into the bonding matrix, but the type of filler material and/or the amount of filler material is such that the level of volumetric dilution of the bonding element is relatively low. In another example, the concentration of bonding elements on a volume basis may be relatively low, wherein the bonding elements are more widely dispersed within the bonding matrix such that few, if any of the bonding elements are in contact with one another. This situation may arise if filler material is incorporated into the bonding matrix, and the type of filler material and/or the amount of filler material is such that the level of dilution is relatively high. Furthermore, the concentration of bonding elements on a volume basis may be one where all or substantially all of the bonding elements contact each other.

Figure 2A:
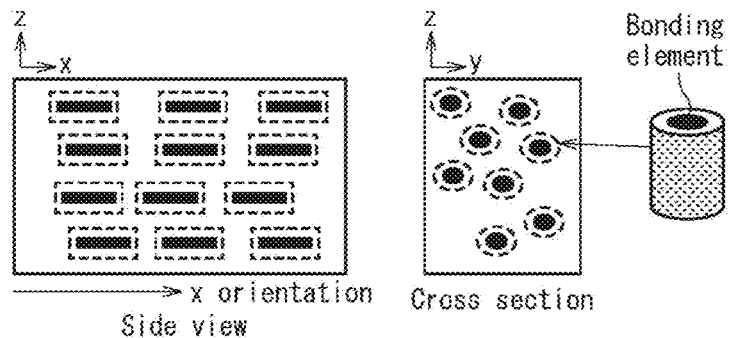
FIGS. 2(a)-2(d)
Figure 2B:
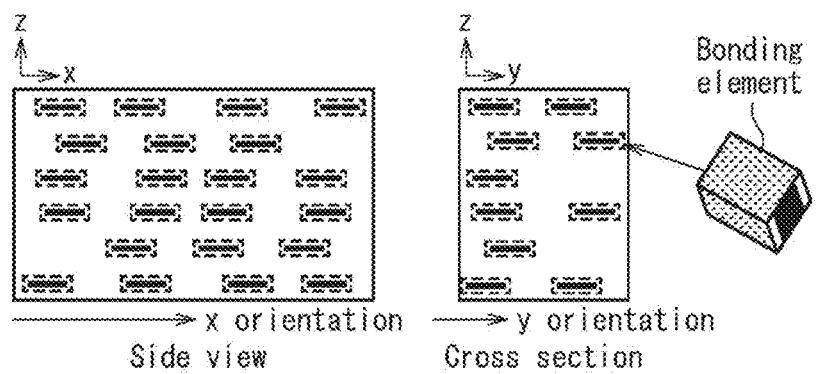
Figure 2C:
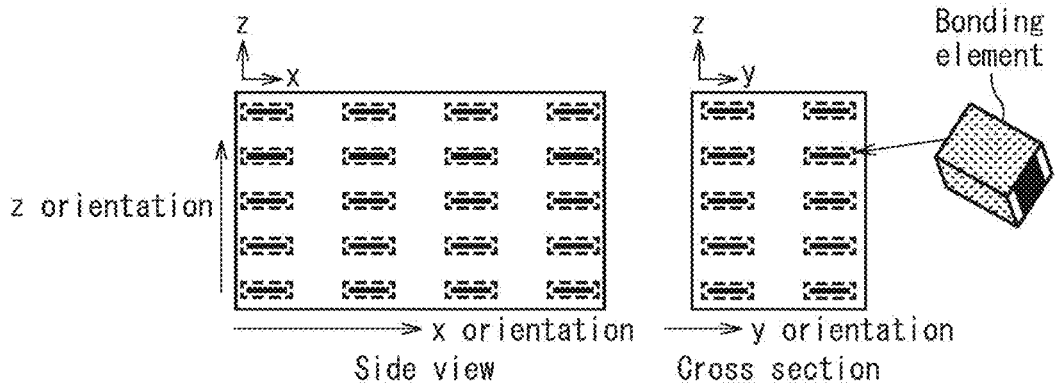
Figure 2D:
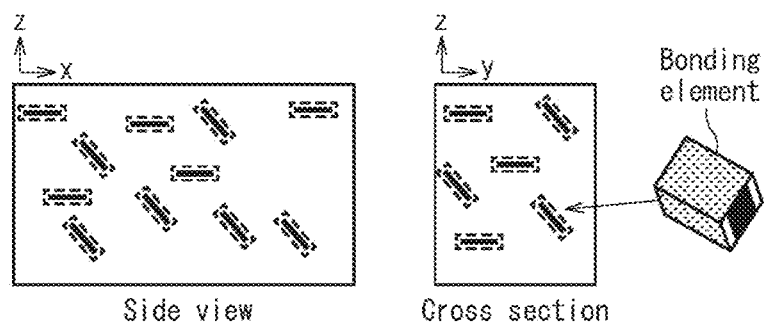
Figure 2E:
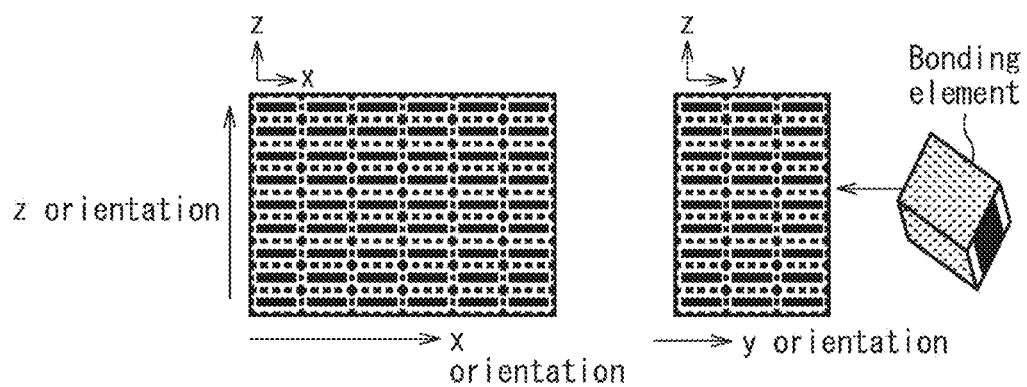
FIGS. 2(e)-2(f)
Figure 2F:
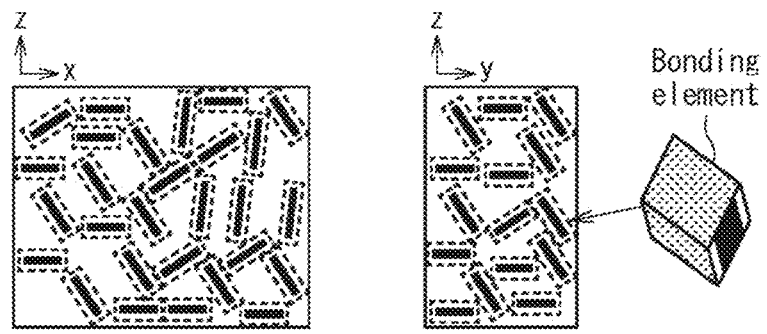

FIGS. 2(a) to 2(d) illustrate bonding matrices that include fiber- or platelet-shaped bonding elements in different orientations possibly diluted by the incorporation of filler material as represented by the spacing between the bonding elements. FIG. 2(e) illustrates a bonding matrix that includes a relatively high concentration of platelet-shaped bonding elements that are aligned in a 3-D orientation, for example, the x-, y-, and z-directions. A relatively high concentration of bonding elements is shown by the lack of filler around the bonding elements, therefore, there is almost no or absolutely no dilution of bonding elements. In contrast, FIG. 2(f) illustrates a bonding matrix that includes a relatively low concentration of platelet-shaped bonding elements that are situated in a random orientation. A relatively low concentration of bonding elements is shown by the presence of fillers around the bonding elements; therefore, there is at least a certain extent of dilution of bonding elements. Due to the concentration and orientation of the bonding elements in FIG. 2(f), the composite material can be called a percolation network.

For example, a one-level repeating hierarchic system generally is formed by blending two different sizes of one different order or ranges of particle sizes and can be described as a "composite material". Larger size particles are not limited to these, but these may be arranged in hexagonal dense packing or cubic dense packing or random packing or other such different types of packing and form a network including void spaces, while smaller size particles can be positioned in the voids of the larger size particles. Ideally, these hierarchic systems can be prepared using different size particles at the different levels. For example, bonding elements constituted by spherical particles having 1 mm diameters fill the void spaces of packed spherical particles having 10 mm diameters. However, in actuality, it is difficult to obtain monodispersing particles; therefore a hierarchic system is shown by use of a continuous distribution of mode of particle size.

Figure 9:
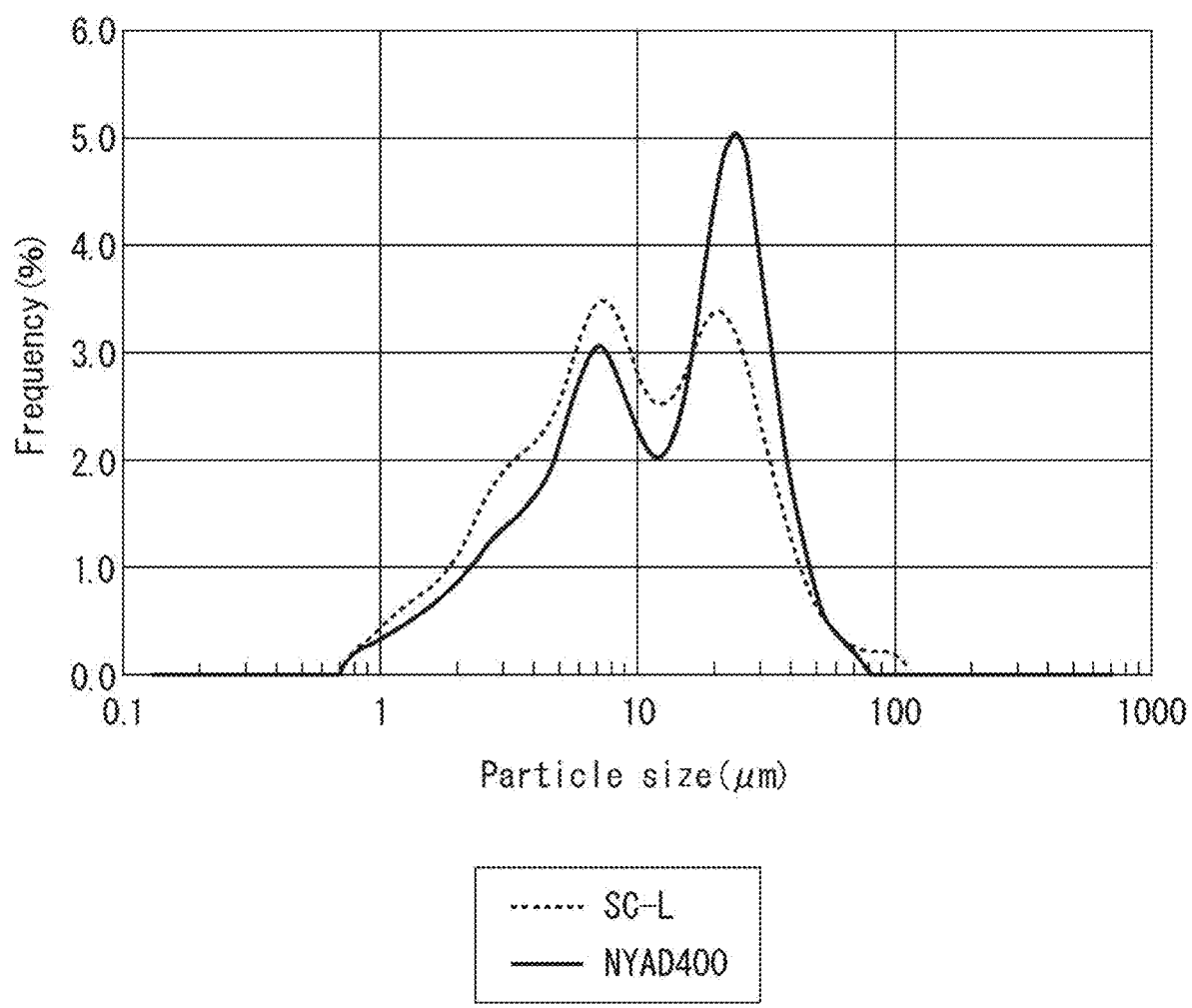
FIG. 9 is a graph that shows one example of particle size distributions of synthetic wollastonite (SC-L®) and NYAD400® (natural wollastonite).

The plurality of bonding elements may have any suitable median particle size and size distribution depending on the desired composite material. However, in the present embodiment, as explained below, it is necessary to raise the carbonation degree in a radius 0.2 m to 3.0 μm pore volume in the plurality of voids, so the bonding elements can be made sizes suitable for this, for example, as shown in FIG. 9, about 2 μm to 50 μm in range. Further, as explained above, the particle size of the bonding element increases somewhat over the particle size of the precursor due to the presence of the $SiO_2$-rich first layer that is produced by carbonation of the precursor of the bonding element and partially or fully surrounds the calcium silicate core and the $CaCO_3$-rich second layer that partially or fully surrounds the first layer.

A plurality of bubbles is formed by the gas material, which is generated by the aerating agent. In the present embodiment, preferably a plurality of bubble voids is formed by the hydrogen gas, which is generated by reaction of the aerating agent under alkali conditions. The aerating agent is preferably a powder containing at least one of aluminum, iron, calcium carbonate, and their mixtures, more preferably is a metal aluminum powder. In the present embodiment, the size of the bubbles is generally a radius of 10 μm or more. Any suitable aerating agent may be utilized so long as it is able to form a plurality of voids constituting bubble-shaped and/or interconnected channels.

The amount of pores is also depended on the initial water content of the mixture at the time of mixing the materials and by the degree of progress of carbonation at the time of carbonation. This is also related to the pore volume with pores having a radius of 0.004 μm to 10.0 μm (e.g., from 0.004 μm to 5.0 μm, from 0.004 μm to 1.0 μm, from 0.004 μm to 0.5 μm, from 0.004 μm to 0.1 μm, from 0.004 μm to 0.05 μm, from 0.004 μm to 0.01 m, from 0.01 μm to 10.0 μm, from 0.05 μm to 10.0 μm, from 0.1 μm to 10.0 μm, from 0.5 μm to 10.0 μm, from 1.0 μm to 10.0 μm).

The composite material of the present embodiment can be produced by a process of production comprising the following steps:

forming a wet mixture, wherein the wet mixture comprises water, filler particles comprising CaO or Si having a size of a particle size of 0.1 μm to 1000 μm, particles of ground calcium silicate composition, and an aerating agent and has a water/solid ratio (W/S) of 0.45 or less; a step of casting the wet mixture in a mold;

allowing the aerating agent to generate hydrogen gas thereby causing volume expansion of the wet mixture;

pre-curing the obtained expanded mixture to make it sufficient hard enabling it to be taken out from the mold and moved;

cutting the obtained pre-cured expanded mixture into a desired product shape (e.g., using piano wire); and causing carbonation of the cut expanded mixture to cure it at ordinary pressure, 60° C. or more of temperature, a relative humidity of 65% or more, and an atmosphere of a $CO_2$ gas concentration of 95% for 6 hours to 60 hours.

When forming a wet mixture, various ingredients are mixed in a specified order. For example, water is added; filler particles comprising CaO or Si having a particle size 0.1 μm to 1000 μm size and ground calcium silicate composition are added and mixed, then the aerating agent is added and mixed.

In a preferred embodiment, the particles of ground calcium silicate composition are from about 0.5 μm to 100 μm in size and are ground particles of natural occurring or synthetic calcium silicate composition. For example, in an exemplary carbonatable calcium silicate composition, the filler particles comprising CaO or Si having a particle size 1 μm to 300 μm size are ground lime, the aerating agent may be aluminum powder. Further, the particle-like composition may be about 80 wt % to about 95 wt % ground calcium silicate composition, about 5 wt % to about 20 wt % ground lime, and about 0.1 wt % to about 0.5 wt % of aluminum powder in terms of percent with respect to the solid content of ground calcium silicate composition, lime, and other filler particles (below, expressed as "to solids").

In the present embodiment, as explained later, from the viewpoint of raising the compressive strength of the obtained composite material, it is important to make the water/solids ratio (W/S) of the wet mixture which is formed in the step of forming the wet mixture 0.45 or less.

In the present embodiment, the carbonation step can be performed at ordinary pressure, but the present invention does not exclude pressurization. Further, in the present embodiment, the carbonation step can be performed in a $CO_2$ gas concentration 95% atmosphere, but the present invention does not exclude a less than 95% concentration. The particle size of the ground calcium silicate composition, for example, can be about 2 μm to 50 μm in size. The particle size is the median particle size. Further, the bulk density of the particles of ground calcium silicate composition may be about 0.6 g/ml to about 1.2 g/ml.

In the carbonation step, the calcium silicate composition can react with the carbon dioxide, which is dissolved in the water. The calcium cations are leached from the calcium silicate composition whereby the peripheral portion of the calcium silicate core is transformed to calcium-deficient calcium silicate. Along with the calcium cations being leached from the peripheral portion of the core, the structure of the peripheral portion eventually becomes unstable and breaks down thereby transforming the calcium-deficient peripheral portion of the core into a $SiO_2$-rich first layer. Meanwhile, a $CaCO_3$ rich second layer precipitates from the water. The first layer and second layer may be formed from the precursor particle of the bonding element according the following formula (1):

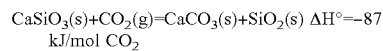

$$CaSiO_3(s)+CO_2(g)=CaCO_3(s)+SiO_2(s) \; \Delta H°=-87 \; kJ/mol \; CO_2 \qquad (2)$$

In a carbonation reaction of a silicate mineral such as wollastonite, $CO_2$ is introduced as a gas phase that dissolves into an infiltration fluid such as water. The dissolution of $CO_2$ forms acidic carbonic species that results in a decrease of pH in solution. The weakly acidic solution dissolves a fixed amount of calcium species from $CaSiO_3$. The released calcium cations and the dissolved carbonate species lead to the precipitation of insoluble carbonates. Here, the silica-rich first layers are thought to remain on the mineral particles as depletion layers. In this way, in the present embodiment, the first layer and second layer on the core act as a barrier to further reaction between calcium silicate and carbon dioxide, resulting in the bonding element having a core, first layer, and second layer. The $CaCO_3$ produced from the $CO_2$ carbonation reactions disclosed herein may exist as one or more of several $CaCO_3$ polymorphs (e.g., calcite, aragonite, and vaterite). The $CaCO_3$ are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

In a preferable aspect, gas-assisted HLPS processes utilize partially infiltrated pore space so as to enable gaseous diffusion to rapidly infiltrate the expanded mixture after the pre-curing step and saturate thin liquid interfacial solvent films in the pores with dissolved $CO_2$. $CO_2$ species have low solubility in pure water (1.5 g/liter at 25° C., 1 atm). Thus, $CO_2$ must be continuously supplied to and distributed throughout the expanded mixture after the pre-curing step to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, 87th Edition 2006-2007, CRC). This partially infiltrated state enables the reaction to proceed to a high degree of carbonation in a fixed period of time.

In the HLPS method, usually the expanded mixture after the pre-curing step comprising a plurality of precursor particles is cut to a predetermined shape, and is then placed in a carbonation curing chamber and heated. Water as a solvent is introduced into the pores in the expanded mixture by vaporizing the water in the chamber. A cooling plate above the expanded mixture condenses the evaporated water that then drips onto the expanded mixture and into the pores, thus partially saturating the pores. Alternatively, the water can be heated and sprayed. Meanwhile, the reactant carbon dioxide is pumped into the chamber, and the carbon dioxide diffuses into the partially saturated pores of the expanded mixture after the pre-curing step. Once in the pores, the carbon dioxide dissolves in the water, thus allowing the reaction between the precursor particles and the carbon dioxide to transform the peripheral portion of the precursor particle into the first and second layers. As the reaction between the reactant and the first layer progresses, the reactant continues to react with the first layer, transforming the peripheral portion of the first layer into the second layer. The formation of the second layer may be by the exo-solution of a component in the first layer, and such a second layer may be a gradient layer, wherein the concentration of one of the chemical elements (cations) making up the second layer varies from high to low as you move from the core particle surface to the end of the first layer.

The presence of the second layer at the periphery of the precursor core eventually hinders further reaction by separating the reactant and the first layer, causing the reaction to effectively stop, leaving a bonding element having the core, the first layer at a periphery of the core, and a second layer on the first layer. The resulting bonding element is generally larger in size than the original precursor particle, thereby filling in the surrounding porous regions of the expanded mixture after the pre-curing step and bonding with adjacent materials of the expanded mixture after the pre-curing step. As a result, the method allows for net-shape formation of products having substantially the same shape as but a higher density than the original expanded mixture after the pre-curing step. The liquid water in the pores speeds up the reaction rate because it is essential for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Therefore, the bonding elements and matrices can be formed with minimal distortion and residual stresses.

Therefore, in the carbonation step, to produce a product with the desired physical properties, various combinations of curing conditions including the reaction temperature and pressure are studied. For example, water is present as residual water in the expanded mixture after the pre-curing step. To maintain the level of water and prevent loss of water due to evaporation in the carbonation step, water vapor is given to the expanded mixture after the pre-curing step together with the $CO_2$. The carbonation step is generally performed at about 60° C. at ordinary pressure for 18 to 19 hours.

In the above embodiment of the present invention, the temperature at the carbonation step was a temperature of 60° C. or more, but in some cases 80° C. or more is preferable. Further, the relative humidity in the carbonation step was 65% or more, but in some cases, 95% or more is preferable. Further, the time in the carbonation step was 6 hours to 60 hours, but in some cases 40 hours or more is preferable.

As explained above, commercially available aerated concrete (ordinary AAC) realizes a higher compressive strength of approximately 5.0 N/mm$^2$ at an absolute dry density of 0.5 g/cm$^3$ and sufficiently satisfies the strength requirements as a building material, while an aerated composite material using carbonatable calcium silicate composition has a compressive strength which is inferior to the compressive strength of ordinary AAC at the same amount of bubbles when compared with the latter at the current state of the art.

The inventors discovered that the pores having radius from 0.004 μm to 10.0 μm are mostly saturated by water before carbonation. As the carbonatable calcium silicate composition undergoes carbonation, these pores are effectively filled by precipitation of calcium carbonate. The pores in the bubble volume having radius 10.0 μm or more are not saturated by water before carbonation, so at these bubbles the calcium carbonate precipitates only inside the adsorbed water layer. The bubble volume can also be easily controlled by the dosage of the foaming agent (aerating agent), e.g., metal aluminum. In addition to the control of volume of air bubbles, it is very important to control the densification of the solid part supporting the air bubbles (below, also called the "bonding matrix" or simply the "matrix"). Effective control of the pore volume greatly affects the compressive strength. Therefore, in carbonation-cured AAC, to achieve the same compressive strength as that of an ordinary AAC at the same absolute dry density, the challenge lies in increasing the bubble volume while preventing a drop in compressive strength and a reduction in pore volume (in other words, increasing the carbonation so as to densify the solid parts that support the air bubbles).

The present inventors engaged in experiments in the following examples and as a result demonstrated that in carbonation cured AAC, if using carbonatable calcium silicate composition (e.g., ground natural occurring or synthetic wollastonite) to reduce the W/S ratio to 0.45 or less and further, in the carbonation step, in some cases raising the temperature from 60° C. to 80° C., raising the relative humidity RH from 65% to 95%, or extending the carbonation time from 18 hours to 40 or 48 hours, the compressive strength increases and confirmed that it was possible to produce carbon cured AAC with a volume of radius 0.004 μm to 10.0 μm pores in the plurality of voids of 0.30 ml/composite material 1 g or less and with an estimated compressive strength represented by the following formula (1):

$$\text{Estimated compressive strength (absolute dry density}=0.50) = \text{compressive strength} \times (0.50 \div \text{absolute dry density})^2$$

of 2.0 N/mm$^2$ or more.

In the present embodiment, preferably the pore volume with a radius of 0.004 μm to 10.0 μm in the composite material is 0.24 ml/composite material 1 g or less and the estimated compressive strength is 2.5 N/mm$^2$ or more, more preferably the pore volume with a radius of 0.004 μm to 10.0 μm in the composite material is 0.19 ml/composite material 1 g or less and the estimated compressive strength is 3.7 N/mm$^2$ or more, still more preferably the pore volume with a radius of 0.004 μm to 10.0 μm in the composite material is 0.17 ml/composite material 1 g or less and the estimated compressive strength is 4.5 N/mm$^2$ or more, and particularly preferably the pore volume with a radius of 0.004 μm to 10.0

μm in the composite material is 0.15 ml/composite material 1 g or less and the estimated compressive strength is 5.0 N/mm$^2$ or more.

EXAMPLES

Below, the present invention will be explained by way of non-limiting examples.

Example 1

At W/S=0.45, Solidia cement (SC-L®, Solidia Technologies, Piscataway, N.J., USA) 92.50 wt %, lime 7.50 wt %, a water reducer (made by BASF, Glenium7500®, in the table, described as "Glenium") 0.400 wt %, a lime initial hydration retarder constituted by sucrose 0.0378 wt %, a foaming agent constituted by aluminum powder (made by Yamato Metal Powder Co., Ltd., #87) 0.210 wt %, an Al initial foaming retarder constituted by phosphoric acid 1.0 wt % (with respect to Al), and water were mixed by a laboratory scale mixer. Here, first, the water reducer, sucrose, and Solidia cement (SC-L®) were added to a predetermined amount of water, then the mixture was continuously stirred for about 2.5 minutes to form a slurry. Next, lime was added to this and stirred for 30 seconds while forming a uniform slurry, and then Aluminum powder which was dispersed in phosphoric acid diluted in advance 100 fold and had been allowed to stand for at least 1 hour was added to the slurry which was then stirred for 30 seconds to prepare a wet mixture.

Next, the wet mixture was cast into a mold up to a height of about half of the mold. Next, the wet mixture was pre-cured for about 3 to 4 hours in a temperature 70° C. and humidity 95% or more so as to make the wet mixture expand in volume and simultaneously pre-harden. Next, after becoming sufficient hardness for being taken out from the mold, the pre-cured expanded mixture was taken out from the mold. The pre-cured expanded mixture which was taken out was placed in a carbonation curing chamber where the pre-cured expanded mixture was caused to cure by carbonation at a temperature of 60° C., relative humidity of 65%, and carbon dioxide concentration of 95 vol % over 18 hours to prepare the composite material.

In Examples 2 to 7 and Comparative Example 1, composite materials were prepared in the same way as Example 1 except for changing the conditions to those shown in the following Table 1. Further, in Comparative Examples 1 and 2, for the purpose of promoting the increase in hardness of the expanded mixture at the time of pre-curing, DENKA CSA #20® made by Denki Kagaku Kogyo (in the table, described as "CSA") and gypsum (CaSO$_4$.2H$_2$O) were added and mixed in right after adding the Solidia cement (SC-L®). Further, in Comparative Examples 1 and 2 and Examples 4 to 7, as the bubble stabilizer, a surfactant (made by Kao Corporation, FR-14®, in the table, described as "FR-14") was added after adding the water reducer, sucrose, and Solidia cement to water, then stirring them for 1 minute, then the mixture was further stirred for 1.5 minutes to form a slurry. Further, in Examples 6 and 7, as the bonding elements, instead of synthetic wollastonite (SC-L®), natural occurring wollastonite (made by NYCO Minerals, NYAD400) was used and instead of sucrose, sodium glutamate was added.

TABLE 1

| | SC-L (wt %) | NYAD 400 (wt %) | Lime (wt %) | CSA (wt %) | Gypsum (wt %) | W/S | Glenium (wt % to solid content) | Sucrose (wt % to solid content) | Sodium gluconate (wt % to solid content) | Al (wt % to solid content) | Phosphoric acid (wt % to Al) | FR-14 (wt % to Al) | Pre-curing temp. (° C.) | Carbonation process conditions |
|---|---|---|---|---|---|---|---|---|---|---|---|---|---|---|
| Comp. Ex. 1 | 83.71 | | 7.50 | 7.29 | 1.50 | 0.63 | 0.075 | | | 0.13000 | | 20.0 | 60° C. | 60° C. RH65% 18 hours |
| Comp. Ex. 2 | 83.71 | | 7.50 | 7.29 | 1.50 | 0.63 | 0.075 | | | 0.11375 | | 20.0 | 60° C. | 60° C. RH65% 18 hours |
| Ex. 1 | 92.50 | | 7.50 | | | 0.45 | 0.400 | 0.0378 | | 0.2100 | 1.0 | | 70° C. | 60° C. RH65% 18 hours |
| Ex. 2 | 92.50 | | 7.50 | | | 0.45 | 0.075 | 0.0378 | | 0.2100 | 1.0 | | 70° C. | 80° C. RH95% 18 hours |
| Ex. 3 | 92.50 | | 7.50 | | | 0.45 | 0.075 | 0.0378 | | 0.2100 | 1.0 | | 70° C. | 80° C. RH95% 40 hours |
| Ex. 4 | 92.50 | | 7.50 | | | 0.40 | 1.000 | 0.0500 | | 0.1300 | 1.0 | 20.0 | 70° C. | 60° C. RH65% 18 hours |
| Ex. 5 | | 96.0 | 4.00 | | | 0.35 | 1.250 | 0.0500 | | 0.1300 | 1.0 | 20.0 | 70° C. | 80° C. RH95% 48 hours |
| Ex. 6 | | 96.0 | 4.00 | | | 0.45 | 0.250 | | 0.10 | 0.1300 | | 20.0 | 70° C. | 80° C. RH75% 40 hours |
| Ex. 7 | | 96.0 | 4.00 | | | 0.40 | 0.350 | | 0.10 | 0.1300 | | 20.0 | 70° C. | 80° C. RH75% 40 hours |

The properties of the composite materials, which were prepared in Examples 1 to 7 and Comparative Example 1 are shown in the following Table 2.

TABLE 2

|  | Pore volume per composition material 1 g in radius 0.004 μm to 10.0 μm porous region (ml/g) | Absolute dry density | Compressive strength (N/mm$^2$) | Estimated compressive strength (at absolute dry density = 0.50) (N/mm$^2$) | Carbonation degree (%) |
|---|---|---|---|---|---|
| Comp. Ex. 1 | 0.403 | 0.51 | 1.55 | 1.49 | 66.30 |
| Comp. Ex. 2 | 0.398 | 0.50 | 1.49 | 1.46 | 67.77 |
| Ex. 1 | 0.2468 | 0.510 | 2.32 | 2.22 | 67.2 |
| Ex. 2 | 0.2356 | 0.579 | 3.52 | 2.62 | 67.2 |
| Ex. 3 | 0.2217 | 0.564 | 3.58 | 2.81 | 81.3 |
| Ex. 4 | 0.2097 | 0.552 | 3.74 | 3.07 | 69.0 |
| Ex. 5 | 0.1808 | 0.670 | 6.91 | 3.85 | 74.2 |
| Ex. 6 | 0.1605 | 0.581 | 6.30 | 4.66 | 83.0 |
| Ex. 7 | 0.1419 | 0.588 | 7.65 | 5.48 | 78.5 |

Figure 3:
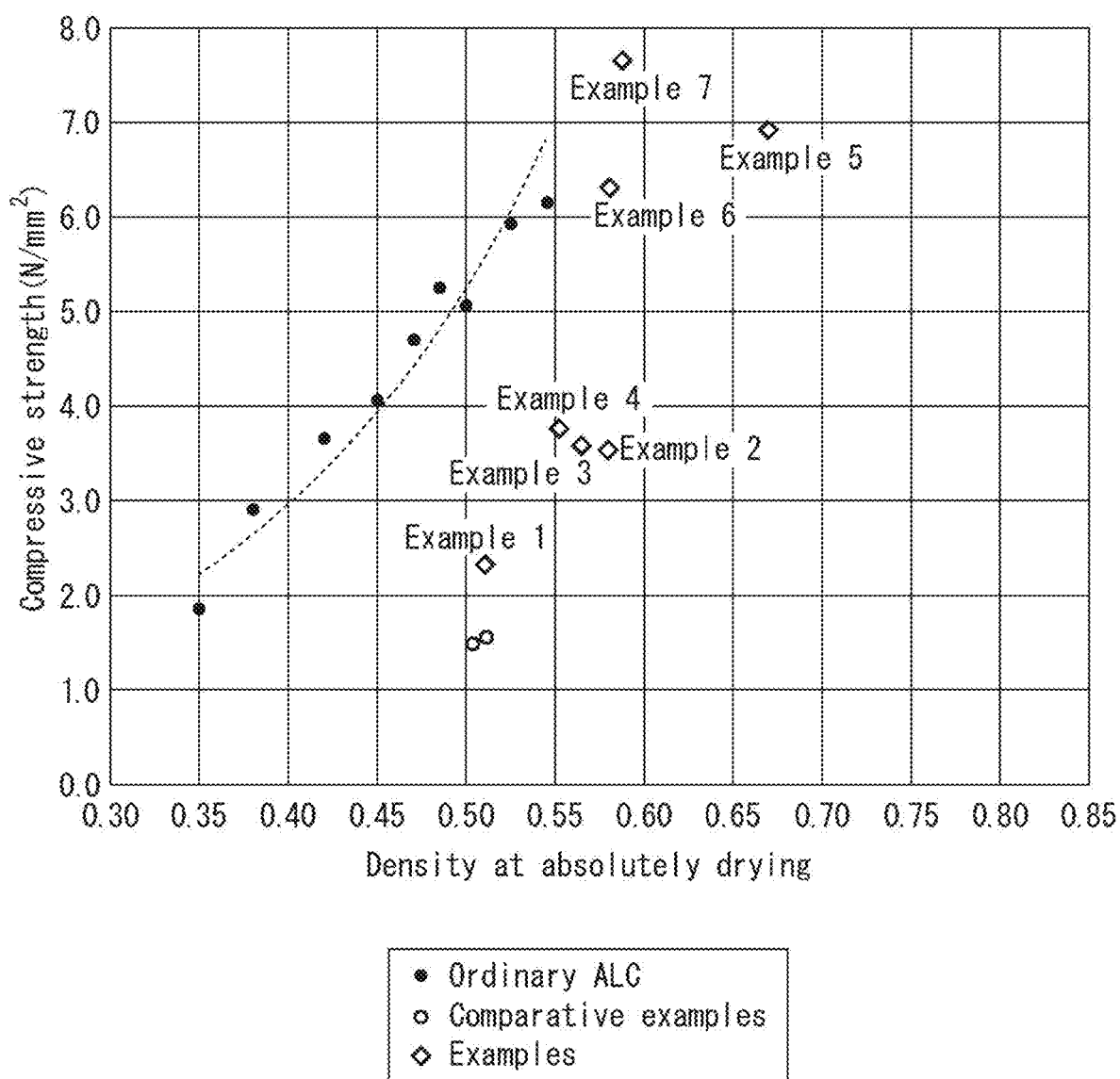
FIG. 3 is a graph that shows the relationship between the absolute drying density and compressive strength of ordinary AAC and carbonation cured AAC.

FIG. 3 shows the relationship between the absolute drying density and compressive strength of ordinary AAC and carbonation cured AAC. It was learned that in carbonation cured AAC, by using Solidia cement (SC-L®) and reducing the W/S ratio to 0.45 or less and further, in the carbonation step, raising the temperature from 60° C. to 80° C., raising the relative humidity RH from 65% to 95%, or extending the carbonation time from 18 hours to 40 or 48 hours, the compressive strength increases and the compressive strength approaches that of ordinary AAC. Here, the absolute drying density (p) of a compressive strength measurement sample was calculated based on the following formula:

$$\text{Absolute dry density } \rho = W2/((D/2)^2 \times \pi \times H/1000)$$

(where, W2 (g) is the weight when drying a sample after measurement of the later explained compressive strength in a convection dryer at 110° C. for a minimum of 4 days until the weight no longer changed, D (mm) is the diameter of the compressive strength measurement sample, and H (mm) is the height of the compressive strength measurement sample).

Here, the compressive strength of the composite material is found in the following way. From the part of the composite materials, a core sample of a diameter 50 mmφ×height 60 mm was taken vertical to the foam direction from the center part in the thickness direction. This sample was dried in a convection dryer at 45° C. for 4 days, then was further allowed to stand at 20° C. at RH 65% for a minimum of 10 days until the weight no longer changed so as to adjust the water content. Further, diameter D (mm), height H (mm), and weight W1 (g) of the sample after adjustment of water content are measured. Next, a universal tester was used to run a compression test at a load speed of 0.3 mm/min and the breaking strength A(N) was measured. Further, the weight W2 (g) of the sample after measurement of the compressive strength was measured. At this time, the compressive strength σ (N/mm$^2$) was found by the following formula:

$$\text{Compressive strength } \sigma \text{ (N/mm}^2\text{)} = A/((D/2)^2 \times \pi)$$

Figure 4:
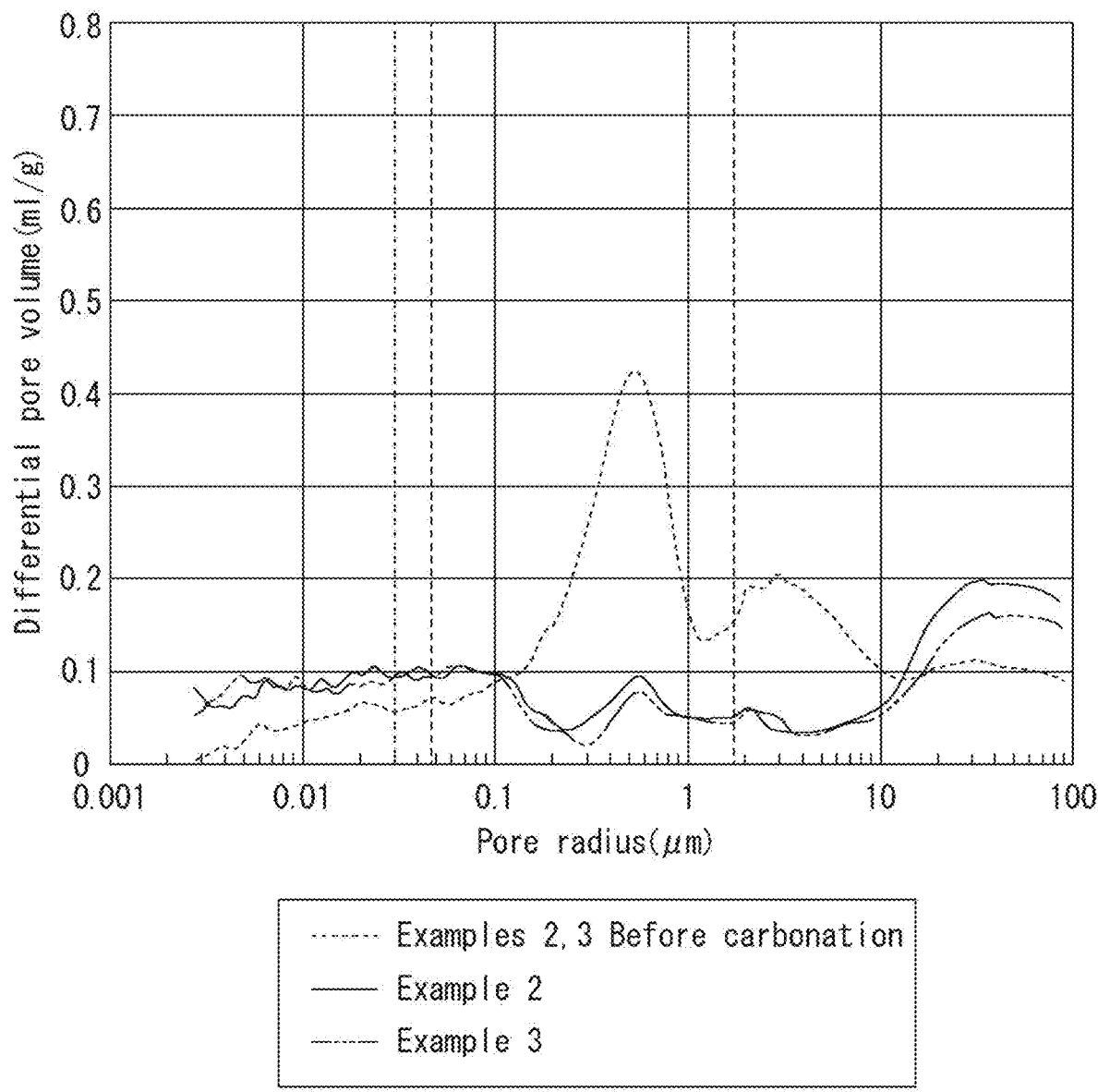
FIG. 4 is a graph that shows the change in pore distribution before and after the carbonation step of carbonation cured AAC at W/S=0.45.
Figure 5:
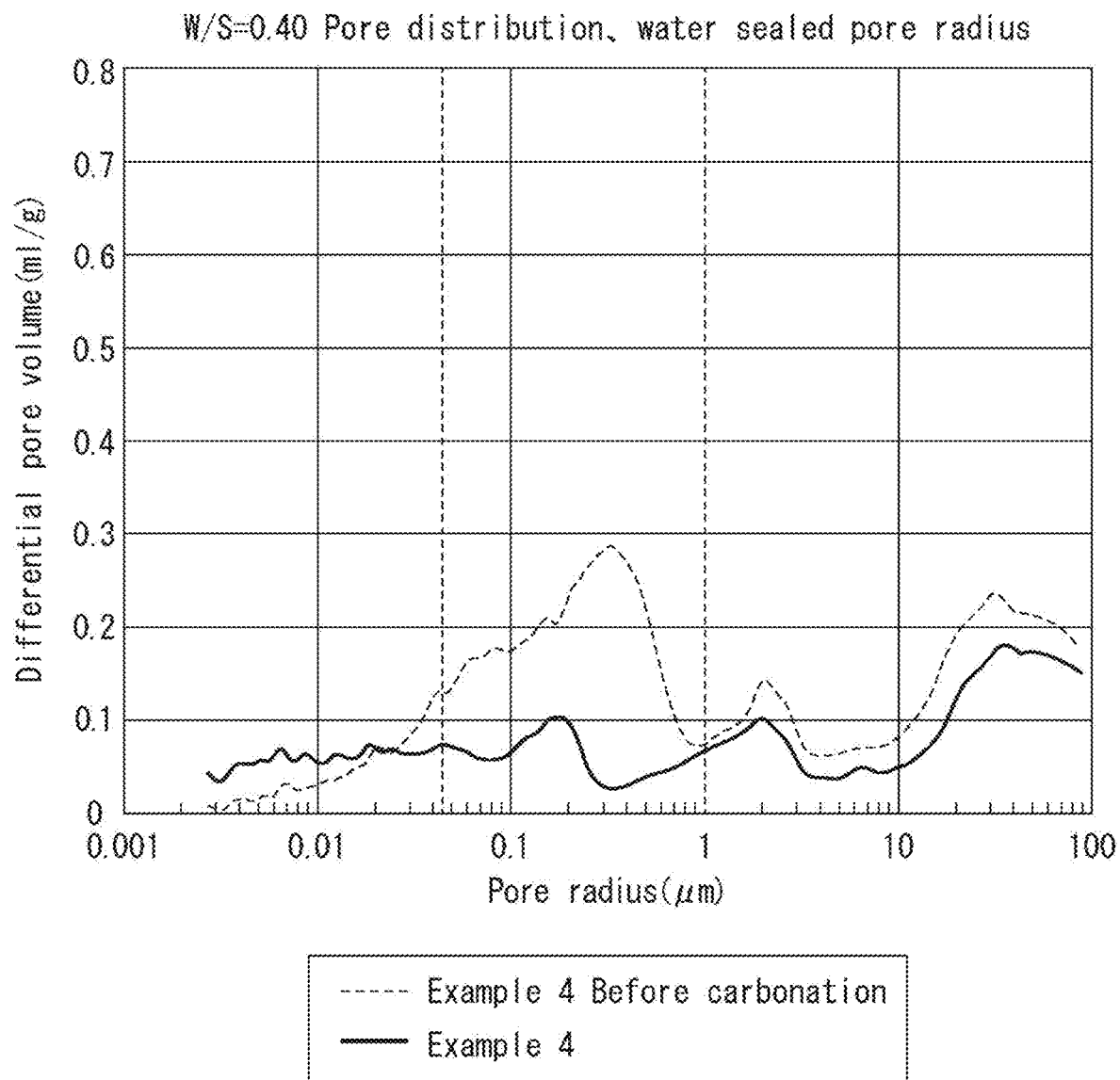
FIG. 5 is a graph that shows the change in pore distribution before and after carbonation of carbonation cured AAC at W/S=0.40.
Figure 6:
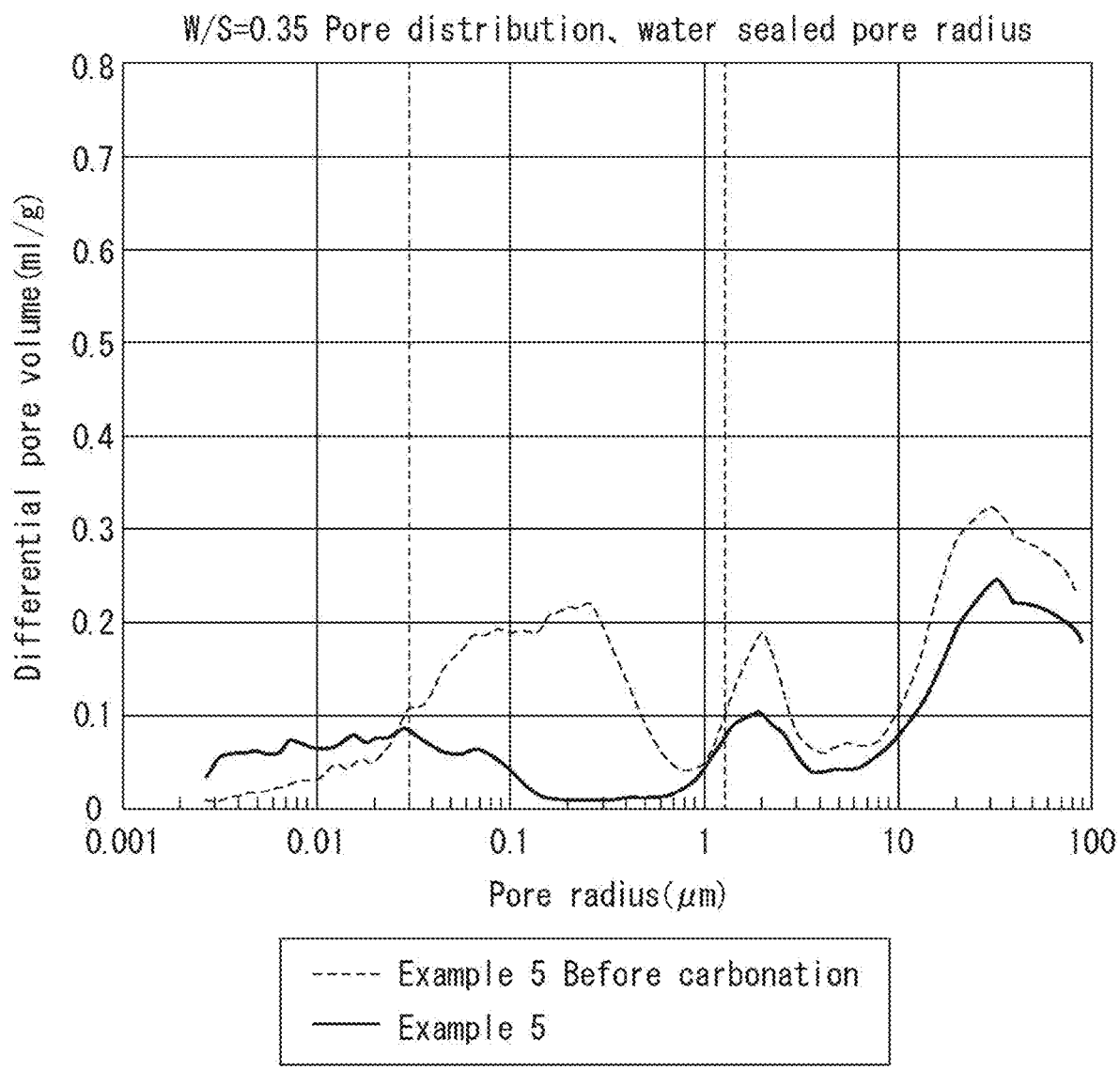
FIG. 6 is a graph that shows the change in pore distribution before and after carbonation of carbonation cured AAC at W/S=0.35.

As respectively shown in FIGS. 4 to 6, the changes of the pore size distribution before and after carbonation were measured at W/S=0.45, 0.40, and 0.35. As a result, it was learned that the expanded mixture before the carbonation step or the carbonated composite material had the following porous regions:

Pore A region: the region having 0.004 μm to 0.2 μm pore radius, that is, the pores of this region is newly formed between plurality of bonding elements as a result of bonding element precursor being converted to bonding elements by carbonation (size becoming somewhat larger than precursor due to formation of first layer and second layer), Pore B region: the region having 0.2 μm to 3.0 μm pore radius, that is, the pores of this region still present before carbonation step, sealed by water, and filled with bonding elements due to active carbonation, Pore C region: the region having 3.0 μm to 10.0 μm pore radius, that is, the pores of this region present before carbonation step, and is not sealed by water, and filled with bonding elements due to carbonation only inside adsorbed water layer, Bubble region: the region having over 10.0 μm pore radius, that is, the pores of this region present before carbonation step, and is not sealed by water, and filled with bonding elements due to carbonation only inside adsorbed water layer, for example, the region where production can be controlled by the aerating agent of aluminum powder.

In FIGS. 4 to 6, the "pore volume" means the total amount of pore volume in the range of a predetermined pore radius (for example radius 0.004 μm to 10.0 μm) which is measured by the mercury intrusion method. Here, the "mercury intrusion method" measures the pore diameter distribution from the relationship between the intrusion pressure and intrusion amount when pressing mercury to the inside of a porous material such as lightweight aerated concrete and is calculated assuming the pores are cylindrical in shape. In FIGS. 4 to 6, the measurable range of pore size was 0.004 μm to 80 μm or so, but the measurement value is not one which expresses the actual pore radius, but is used as an indicator which expresses the size of gaps present between component materials and is an extremely effective means for analysis in showing the pore structure of a porous material such as lightweight aerated concrete.

Specifically, in the above examples and comparative examples, the part of the composite materials was crushed and sized to obtain a 2 to 4 mm part. This was dried at 105±5° C. until reaching a constant weight and rendered an absolute dry state for use as a measurement sample. This measurement sample was measured for pore size distribution using a "Pore Master-33®" made by Yuasa Ionics. At this time, the contact angle of the mercury and sample was 130° and the surface tension of the mercury was calculated as 484 dyn/cm. Here, the pore volume was found from the obtained pore size distribution as the pore volume in the range of a pore diameter of 0.004 µm to 10.0 µm to a unit mass (1 g) of the solids of the measurement sample (total pore amount).

As shown in FIGS. 4 to 6, it was learned that with W/S=0.45, 0.40, and 0.35, carbonation causes a decrease in the total amount of pore volume at the pore A, B and C region, that is, the region having a 0.004 µm to 10.0 µm pore radius and that this region is a predominately carbonated region.

The present inventors, based on the discovery that by decreasing the W/S ratio to 0.45 or less and, in the carbonation step, raising the temperature from 60° C. to 80° C., raising the relative humidity RH from 65% to 95%, or extending the carbonation time from 18 hours to 40 or 48 hours, the compressive strength increases, studied the relationship of the pore volume per composite material 1 g of the mainly carbonated porous region of the "region having a 0.004 µm to 10.0 µm pore radius", carbonation degree, and compressive strength.

Figure 7:
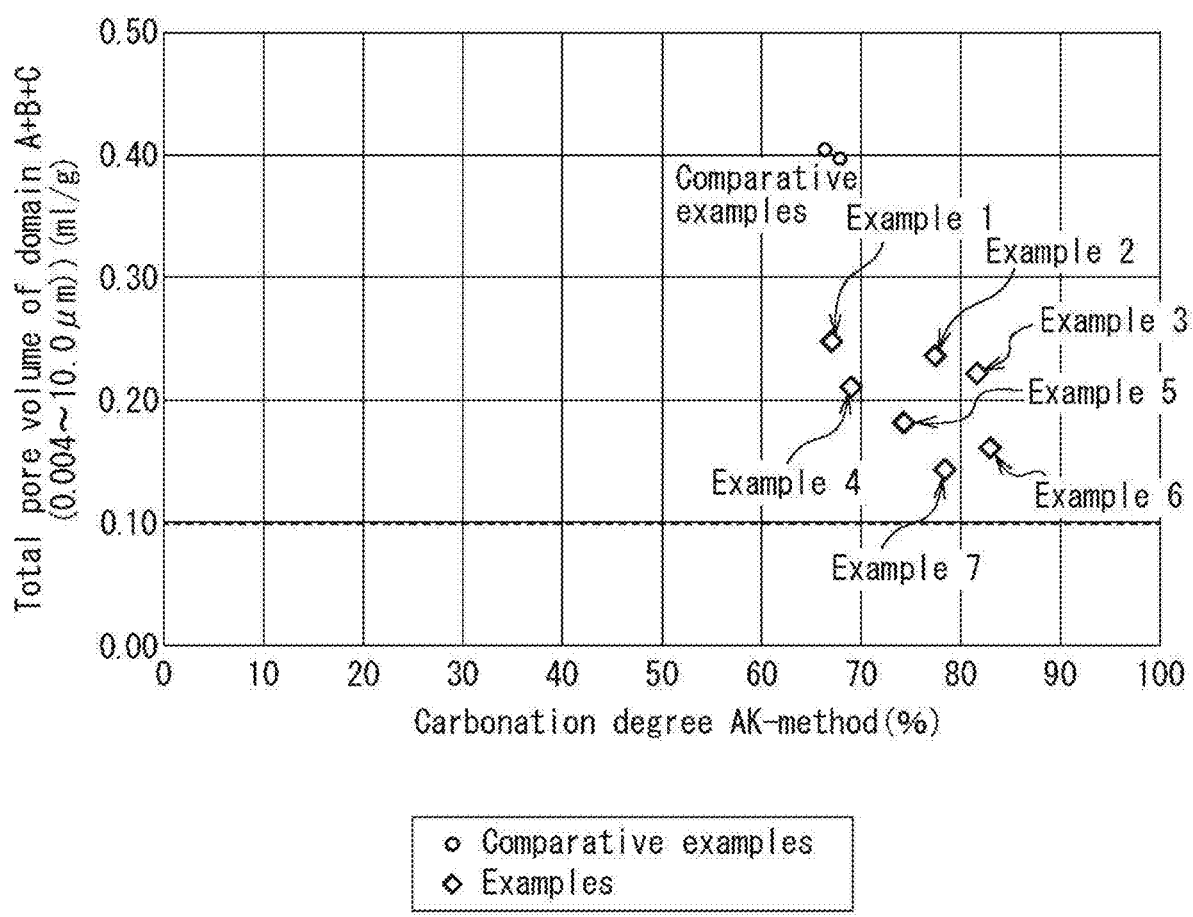
FIG. 7 is a graph that shows the relationship between the carbonate degree of carbonation cured AAC and the volume per composite material 1 g of a radius 0.004 μm to 10.0 μm porous region.

FIG. 7 is a graph which shows the relationship between the carbonation degree of carbonation cured AAC and the pore volume per composite material 1 g of the radius 0.004 µm to 10.0 µm pore region. From FIG. 7, it was confirmed that in carbonation cured AAC with a volume per composite material 1 g of the "region having a 0.004 µm to 10.0 µm pore radius" less than 0.30 ml/composite material 1 g, by raising the temperature from 60° C. to 80° C., raising the relative humidity RH from 65% to 95%, or extending the carbonation time from 18 hours to 40 or 48 hours, the carbonation degree increases.

Here, the "carbonation degree" means the ratio of the calcium component that actually reacts with the carbon dioxide in the composite material and is present in the composite material as calcium carbonate to the total calcium component that can react with carbon dioxide. The amount of the calcium component that actually reacts with the carbon dioxide in the composite material and is present in the composite material as calcium carbonate can be measured as the amount of gas (V) of carbon dioxide which is produced when dissolving the composite material in acid. On the other hand, the amount of the total calcium component which can react with the carbon dioxide can be obtained by grounding up the composite, then calculating the CaO content in the composite by fluorescent X-ray analysis by the glass bead method, then calculating the amount of $CO_2$ gas (v) of an equivalent molar quantity with this. Specifically, "v" is the amount of gas (ml) which is obtained by drying the composite at 105° C. for 24 hours, then grounding it up, precisely measuring 100 to 500 mg as a sample, then dissolving it in a 5N hydrochloric acid aqueous solution, measuring the amount of carbon dioxide gas generated, and converting this to 1 g of sample. Further, V is calculated by measuring the CaO content in the composite by fluorescent X-ray analysis by the glass bead method, then finding the amount (V) of $CO_2$ gas of an equivalent molar quantity to this by the following formula:

$$V \text{ (ml)} = CaO \text{ content (wt \%)} \times 22400/(100 \times 56).$$

In this case, the carbonation degree (%) is expressed by the following formula:

$$\text{Carbonation degree (\%)} = (v/V) \times 100$$

Figure 8:
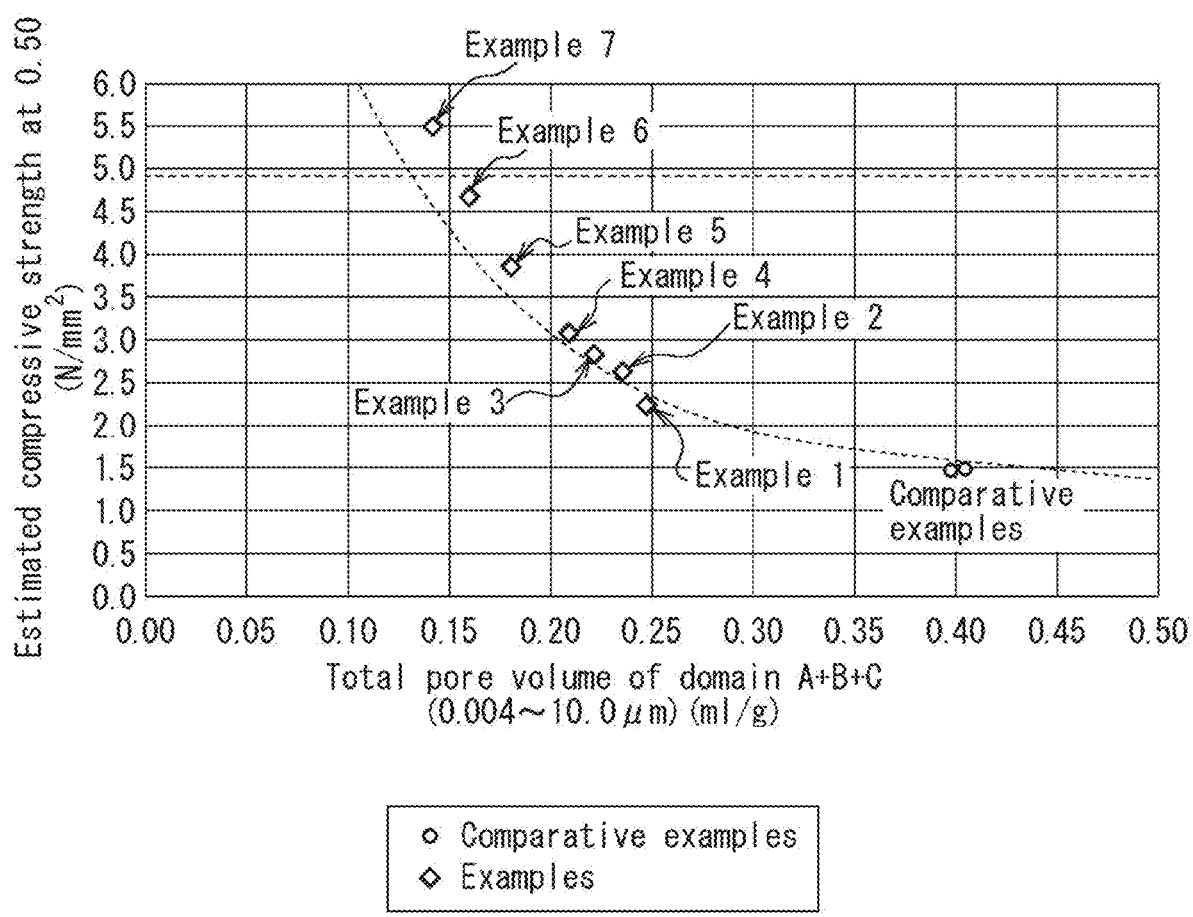
FIG. 8 is a graph that shows the relationship between volume per composite material 1 g of a radius 0.004 μm to 10.0 μm porous region (pore volume) and an estimated compressive strength at a density 0.50.

FIG. 8 is a graph which shows the relationship between the pore volume per composite material 1 g of the radius 0.004 µm to 10.0 µm pore region and the estimated compressive strength at an absolute dry density 0.50 in the carbonation cured AAC of the examples according to the present invention. Here, the estimated compressive strength at an absolute dry density 0.50 represented by the following formula:

$$\text{Estimated compressive strength (absolute dry density=0.50)} = \text{compressive strength} \times (0.50 \div \text{absolute dry density})^2$$

for standardizing the effect on the compressive strength of the change of the amount of air bubbles in the composite material 1 g, that is, the volume of the bubble region, and evaluating the effect on the compressive strength of only the volume per composite material 1 g of the "region having a pore radius of 0.004 µm to 10.0 µm".

From FIG. 8, it was learned that if the volume of the pore region of "the region having a 0.004 µm to 10.0 µm pore radius" per composite material 1 g is 0.30 ml/composite material 1 g or less, the estimated compressive strength becomes 2.0 N/mm² or more. In particular, it was learned that along with the decrease in the pore volume, the estimated compressive strength approached 5.0 N/mm².

From the above results, it was learned that in carbonation cured AAC, by using Solidia cement (SC-L®) or ground natural occurring wollastonite (NYAD400®) and reducing the W/S ratio to 0.45 or less and also raising the temperature in the carbonation step from 60° C. to 80° C., raising the relative humidity RH from 65% to 95%, or extending the carbonation time from 18 hours to 40 or 48 hours, it is possible to produce carbonation cured AAC where the carbonation degree increases in the pore region of "the region having a 0.004 µm to 10.0 µm pore radius" and the pore volume with a radius of 0.004 µm to 10.0 µm in the plurality of voids is made 0.30 ml/composite material 1 g or less and the estimated compressive strength becomes 2.0 N/mm² or more, preferably if the pore volume is 0.24 ml/composite material 1 g or less, the estimated compressive strength becomes 2.5 N/mm² or more, more preferably if the pore volume is 0.19 ml/composite material 1 g or less, the estimated compressive strength becomes 3.7 N/mm² or more, still more preferably if the pore volume is 0.17 ml/composite material 1 g or less, the estimated compressive strength becomes 4.5 N/mm² or more, and particularly preferably if the pore volume becomes 0.15 ml/composite material 1 g or less, the estimated compressive strength becomes 5.0 N/mm² or more.

The fact that various revisions and changes can be made in the present invention without departing from the spirit or scope of the invention will be apparent to persons skilled in the art. Therefore, the present invention includes such revisions and modifications so long as within the scope of the appended claims and their equivalents.

The composite material according to the present invention is carbonation cured AAC which has a compressive strength substantially equal to that of ordinary AAC, so avoids the problems of carbonation in ordinary AAC while realizing a strength substantially equal to the strength of ordinary AAC and therefore can be suitably used as a building material.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is the to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

The invention claimed is:

1. A composite material comprising:
 a plurality of bonding elements, each including a core comprising calcium silicate, a first layer which partially or fully surrounds the core and is rich in $SiO_2$, and a second layer which partially or fully surrounds the first layer and is rich in $CaCO_3$;
 a plurality of filler particles having particle sizes of 0.1 μm to 1000 μm;
 wherein the plurality of bonding elements and plurality of filler particles together form a bonding matrix and are substantially evenly dispersed in the matrix and bonded together, the bonding matrix having a pore volume;
 the pore volume comprises pores with a radius greater than 10.0 μm,
 the pore volume further comprising 0.142-0.247 ml/1.0 g of composite material of pores with a radius of 0.004 μm to 10.0 μm,
 the composite material having an absolute dry density, as measured after drying a sample of the composite material in a convection dryer at 110° C. for at least 4 days, of 0.50 g/cm³ or more,
 the composite material having an estimated compressive strength, when the compressive strength is measured at an absolute dry density of 0.50 g/cm³, expressed by the following formula (1): Estimated compressive strength=compressive strength×(0.50÷absolute dry density)² of 2.0 N/mm² or more.

2. The composite material according to claim 1, wherein the pore volume comprised of pores with a radius of 0.004 μm to 10.0 μm in the composite material is 0.24 ml/1 g of composite material or less and the estimated compressive strength is 2.5 N/mm² or more.

3. The composite material according to claim 2, wherein the pore volume comprised of pores with a radius of 0.004 μm to 10.0 μm in the composite material is 0.19 ml/1 g of composite material or less and the estimated compressive strength is 3.7 N/mm² or more.

4. The composite material according to claim 3, wherein the pore volume comprised of pores with a radius of 0.004 μm to 10.0 μm in the composite material is 0.17 ml/1 g of composite material or less and the estimated compressive strength is 4.5 N/mm² or more.

5. The composite material according to claim 4, wherein the pore volume comprised of pores with a radius of 0.004 μm to 10.0 μm in the composite material is 0.15 ml/1 g of composite material or less and the estimated compressive strength is 5.0 N/mm² or more.

6. The composite material according to claim 1, wherein the plurality of bonding elements is chemically transformed from ground calcium silicate selected from natural or synthetic sources.

7. The composite material according to claim 6, wherein the ground calcium silicate comprises one or more of a group of calcium silicate phases selected from CS (wollastonite or pseudowollastonite), C3S2 (rankinite), C2S (belite, lamite, bredigite), an amorphous calcium silicate phase, each of which material optionally comprises one or more metal ions or oxides, or blends thereof.

8. The composite material according to claim 7, wherein the plurality of bonding elements are chemically transformed from ground calcium silicate by reacting the ground calcium silicate with $CO_2$ via a controlled hydrothermal liquid phase sintering (HLPS) process.

9. The composite material according to claim 1, wherein the filler particles are a CaO-rich material.

10. The composite material according to claim 1, wherein the filler particles are selected from the group consisting of lime and quartz.

11. The composite material according to claim 1, wherein the filler particles are selected from the group consisting of industrial waste, lime, slag, and silica fume.

12. The composite material according to claim 1, wherein the plurality of voids are formed by hydrogen gas, which is generated by reacting an aerating agent in an alkaline environment.

13. The composite material according to claim 11, wherein the aerating agent is a powder which includes at least one of aluminum, iron, calcium carbonate, and blends of the same.

14. The composite material according to claim 1, wherein
 the pore volume comprising 0.142-0.181 ml/1.0 g of composite material of pores with a radius of 0.004 μm to 10.0 μm,
 the composite material having an absolute dry density, as measured after drying a sample of the composite material in a convection dryer for at least 4 days, of 0.58 g/cm³ to 0.67 g/cm³, and
 the composite material having an estimated compressive strength, when the compressive strength is measured at an absolute dry density of 0.50 g/cm³, expressed by the formula (1) of 3.85-5.48 N/mm² or more.

15. The composite material according to claim 1, wherein the composite material has an absolute dry density of 0.51 g/cm³ to 0.67 g/cm³.

16. A carbonation-cured composite material comprising:
 a plurality of bonding elements, each including a core comprising calcium silicate, a first layer which partially or fully surrounds the core and is rich in $SiO_2$, and a second layer which partially or fully surrounds the first layer and is rich in $CaCO_3$, wherein the plurality of bonding elements are chemically transformed from ground calcium silicate by reacting the ground calcium silicate with $CO_2$ by a carbonation reaction;

a plurality of filler particles having particle sizes of 0.1 μm to 1000 μm;

wherein the plurality of bonding elements and plurality of filler particles together form a bonding matrix and are substantially evenly dispersed in the matrix and bonded together;

a pore volume comprising pores with a radius greater than 10.0 μm, the pore volume further comprising 0.142-0.247 ml/1.0 g of composite material of pores with a radius of 0.004 μm to 10.0 μm, the composite material having an absolute dry density, as measured after drying a sample of the composite material in a convection dryer at 110° C. for at least 4 days, of 0.50 $g/cm^3$ or more, the composite material having an estimated compressive strength, when the compressive strength is measured at an absolute dry density of 0.50 $g/cm^3$, of 2.0 $N/mm^2$ or more.

* * * * *